(12) United States Patent
Ooga et al.

(10) Patent No.: US 6,740,721 B2
(45) Date of Patent: May 25, 2004

(54) PLASTIC LENS COMPOSITION, PLASTIC LENS, AND PROCESS FOR PRODUCING THE PLASTIC LENS

(75) Inventors: Kazuhiko Ooga, Oita (JP); Tsuneo Tajima, Oita (JP); Kazufumi Kai, Oita (JP); Hiroshi Uchida, Oita (JP)

(73) Assignee: Showa Denko K.K., Tokyo (JP)

( * ) Notice: Subject to any disclaimer, the term of this patent is extended or adjusted under 35 U.S.C. 154(b) by 135 days.

(21) Appl. No.: 09/959,598

(22) PCT Filed: Sep. 26, 2001

(86) PCT No.: PCT/JP01/08398

§ 371 (c)(1),
(2), (4) Date: Oct. 31, 2001

(87) PCT Pub. No.: WO02/26843

PCT Pub. Date: Apr. 4, 2002

(65) Prior Publication Data

US 2003/0149141 A1 Aug. 7, 2003

Related U.S. Application Data

(60) Provisional application No. 60/244,605, filed on Nov. 1, 2000.

(30) Foreign Application Priority Data

Sep. 28, 2000 (JP) ........................................ 2000-295737
Jun. 11, 2001 (JP) ........................................ 2001-175017
Sep. 11, 2001 (JP) ........................................ 2001-275062

(51) Int. Cl.$^7$ ........................... C08F 18/24; C08L 27/00
(52) U.S. Cl. ........................ 526/314; 524/91; 524/147; 524/551; 524/559; 524/561
(58) Field of Search ........................ 524/91, 147, 551, 524/559, 561, 314

(56) References Cited

U.S. PATENT DOCUMENTS 5,204,430 A 4/1993 Renzi et al.

FOREIGN PATENT DOCUMENTS

| JP | 3-124715 A | 5/1991 |
| JP | 7-33831 A | 2/1995 |

*Primary Examiner*—Kriellion A. Sanders
(74) *Attorney, Agent, or Firm*—Sughrue Mion, PLLC

(57) ABSTRACT

A plastic lens composition having a low viscosity, a plastic lens by curing the composition, and a method for producing the plastic lens are disclosed. The plastic lens composition contains a bromine-containing (meth)allyl ester-based compound and exhibits low viscosity and the cured composition has a high refractive index of 1.58 or more and a low specific gravity of 1.40 or less.

56 Claims, 2 Drawing Sheets

PLASTIC LENS COMPOSITION, PLASTIC LENS, AND PROCESS FOR PRODUCING THE PLASTIC LENS

CROSS-REFERENCE TO RELATED APPLICATION

This application is an application filed under 35 U.S.C. §111 (a) claiming benefit, pursuant to 35 U.S.C. §119 (e)(1) of the filing date of the Provisional Application No. 60/244,605 filed Nov. 1, 2000, pursuant to 35 U.S.C. §111 (b).

TECHNICAL FIELD

The present invention relates to a plastic lens composition, a plastic lens obtained by curing the composition, and a process for producing the plastic lens.

More specifically, the present invention relates to a plastic lens composition having a refractive index of 1.58 or more at 25° C. and a specific gravity of 1.40 or less at 23° C.; a lightweight plastic lens having a high refractive index, obtained by curing the composition; and a process for producing the plastic lens.

BACKGROUND ART

Organic glass is lightweight, compared with inorganic glass, and, therefore, organic glasses comprising a polymer such as diethylene glycol bis(allyl carbonate) represented by CR-39 (trade name, produced by PPG) or methyl methacrylate have heretofore been used. However, these organic glasses are disadvantageous in that the refractive index which is from 1.49 to 1.50 is relatively low as compared with inorganic glass (refractive index of white crown glass: 1.523), the thickness is larger than the inorganic glass to impair the effect of reducing the weight and when used as a lens for visual acuity correction, a higher degree of myopia incurs a poor appearance.

In order to cope with this, various organic glasses using a diallyl phthalate-based monomer have been proposed. However, these are fragile or have a problem in transmittance. When this monomer is diluted with a monofunctional polymerizable monomer to deal with these problems, the resistance against heat or solvent is impaired and the capability, as an organic glass, is insufficient.

An allyl ester having an allyl ester group at a terminal, and having inside thereof the following structure derived from a polyhydric saturated carboxylic acid and a polyhydric saturated alcohol, is also known:

wherein R represents a divalent organic residue having from 1 to 20 carbon atoms, B' represents a divalent organic residue derived from a diol, and n represents a number of 1 to 20.

This allyl ester provides a cured material having very excellent impact resistance, but, because an aliphatic hydrocarbon B' is used inside, even if terephthalic acid or isophthalic acid is used as the polyvalent saturated carboxylic acid, the refractive index is lower than that of a cured material of diallyl terephthalate monomer or diallyl isophthalate monomer.

In Japanese Unexamined Patent Publication No. 3-124715 (JP-A-3-124715), the present inventors have proposed an allyl ester resin containing a halogen. However, this resin, as it is, has a high viscosity and a very large specific gravity and cannot be used as an optical material.

In Japanese Unexamined Patent Publication No. 7-33831 (JP-A-7-33831), the present inventors have also proposed a composition containing an allyl ester resin having incorporated thereinto bromine and an optical organic glass obtained by curing the composition. However, in view of the comfort while wearing eyeglasses, an optical organic glass having a low specific gravity and a high refractive index is required. Furthermore, in order to increase the productivity, a composition for plastic articles is required to show good filterability in the filtering of the plastic article composition to ensure easy flowing and quick filling into a mold. To satisfy these requirements, the plastic article composition is required to have a lower viscosity.

On taking account of the balance among three factors of viscosity, the refractive index of the cured material and the specific gravity of the cured material, the composition described in JP-A-7-33831 does not match recent requirements of the market and the composition of JP-A-7-33831 is not an optimal proposal for the recent requirements of the market.

DISCLOSURE OF THE INVENTION

In order to meet with the requirements of the market, an object of the present invention is to solve the above-described problems and provide a plastic lens composition having a viscosity sufficiently low to enable the use for plastic lens materials or other optical materials and ensuring a high refractive index and a relatively low specific gravity of the cured material. Other objects of the present invention are to provide a plastic lens obtained by curing the composition and to provide a process for producing the plastic lens.

As a result of extensive investigations to overcome the above-described problems, the present inventors have found that when a (meth)allyl ester-based compound containing bromine is used, a plastic lens composition capable of providing a cured material favored with a high Abbe number and a relatively small cure shrinkage can be obtained. The present invention has been accomplished based on this finding.

More specifically, the present invention (I) relates to a plastic lens composition comprising a component (α) shown below as an essential component, wherein a cured material obtained by curing the composition has a refractive index of 1.58 or more at 25° C. and a specific gravity of 1.40 or less at 23° C.:

Component (α)

a compound having at least one group represented by the following formula (1) as a terminal group and a group represented by the following formula (2) as a repeating unit:

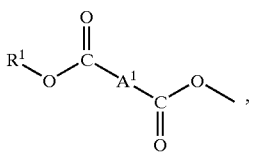

(1)

wherein each R¹ independently represents an allyl group or a methallyl group and each A¹ independently represents an organic residue derived from a dicarboxylic acid or a carboxylic anhydride;

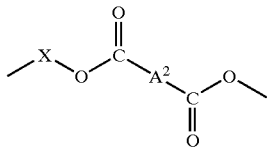

(2)

wherein each A² independently represents an organic residue derived from a dicarboxylic acid or a carboxylic anhydride and each X is independently an organic residue and the X's represent one or more organic residues containing, as an essential component, an organic residue derived from a bromine-containing compound having two or more hydroxyl groups, provided that by the ester bonding, X can have a branched structure having a group of formula (1) as a terminal group and a group of formula (2) as a repeating unit.

The present invention (II) relates to a plastic lens composition comprising a component (α) and a component (β) shown below, wherein a cured material obtained by curing the composition has a refractive index of 1.58 or more at 25° C. and a specific gravity of 1.40 or less at 23° C.:

Component (α)
  a compound having at least one group represented by the following formula (1) as a terminal group and a group represented by the following formula (2) as a repeating unit, in an amount of 10 to 60% by mass based on whole curable components:

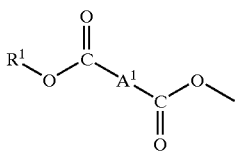

(1)

wherein each R¹ independently represents an allyl group or a methallyl group and each A¹ independently represents an organic residue derived from a dicarboxylic acid or a carboxylic anhydride;

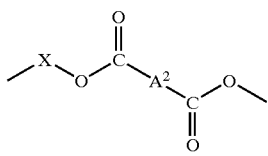

(2)

wherein each A² independently represents an organic residue derived from a dicarboxylic acid or a carboxylic anhydride and each X is independently an organic residue and the X's represent one or more organic residues containing, as an essential component, an organic residue derived from a bromine-containing compound having two or more hydroxyl groups, provided that by the ester bonding, X can have a branched structure having a group of formula (1) as a terminal group and a group of formula (2) as a repeating unit;

Component (β)
  at least one compound selected from the group consisting of compounds represented by the following formulae (3) and (4), in an amount of 10 to 90% by mass based on whole curable components:

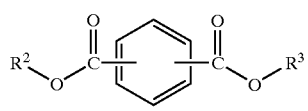

(3)

wherein R² and R³ each independently represents an allyl group or a methallyl group;

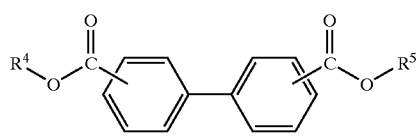

(4)

wherein R⁴ and R⁵ each independently represents an allyl group or a methallyl group.

The present invention (III) relates to a plastic lens composition comprising a component (α), a component (β) and a component (γ) shown below, wherein a cured material obtained by curing the composition has a refractive index of 1.58 or more at 25° C. and a specific gravity of 1.40 or less at 23° C.:

Component (α)
  a compound having at least one group represented by the following formula (1) as a terminal group and a group represented by the following formula (2) as a repeating unit, in an amount of 10 to 60% by mass based on whole curable components:

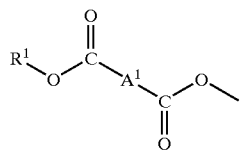

(1)

wherein each R¹ independently represents an allyl group or a methallyl group and each A¹ independently represents an organic residue derived from a dicarboxylic acid or a carboxylic anhydride;

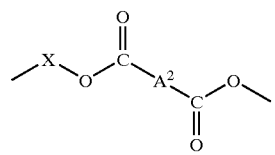

(2)

wherein each A² independently represents an organic residue derived from a dicarboxylic acid or a carboxylic anhydride and each X is independently an organic residue and the X's represent one or more organic residues containing, as an essential component, an organic residue derived from a bromine-containing compound having two or more hydroxyl groups, provided that by the ester bonding, X can have a branched structure having a group of formula (1) as a terminal group and a group of formula (2) as a repeating unit;

Component (β)
  at least one compound selected from the group consisting of compounds represented by the following formulae (3) and (4), in an amount of 10 to 90% by mass based on whole curable components:

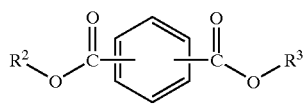
(3)

wherein $R^2$ and $R^3$ each independently represents an allyl group or a methallyl group;

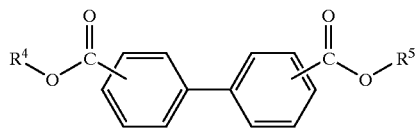
(4)

wherein $R^4$ and $R^5$ each independently represents an allyl group or a methallyl group;

Component (γ)
  at least one compound selected from the group consisting of dibenzyl maleate, diphenyl maleate, dibenzyl fumarate, diphenyl fumarate, (meth)allyl 2-phenylbenzoate, (meth)allyl 3-phenylbenzoate, (meth)allyl 4-phenylbenzoate, (meth)allyl α-naphthoate, (meth)allyl β-naphthoate, (meth)allyl o-chlorobenzoate, (meth)allyl m-chlorobenzoate, (meth)allyl p-chlorobenzoate, (meth)allyl 2,6-dichlorobenzoate, (meth)allyl 2,4-dichlorobenzoate, (meth)allyl o-bromobenzoate, (meth)allyl m-bromobenzoate and (meth)allyl p-bromobenzoate, in an amount of 0 to 20% by mass based on whole curable components.

The present invention (IV) is the plastic lens composition of the present invention (I), (II) or (III) which further comprises an ultraviolet absorbent and/or a light stabilizer in an amount of 0.01 to 2 parts by mass per 100 parts by mass of whole curable components in the plastic lens composition.

The present invention (V) is the plastic lens composition of the present invention (I), (II), (III) or (IV) which further comprises an antioxidant in an amount of 0.01 to 5 parts by mass per 100 parts by mass of whole curable components in the plastic lens composition.

The present invention (VI) is the plastic lens composition of the present invention (I), (II), (III), (IV) or (V) which further comprises at least one radical polymerization initiator in an amount of 0.1 to 10 parts by mass per 100 parts by mass of whole curable components in the plastic lens composition.

The present invention (VII) is a plastic lens having a refractive index of 1.58 or more at 25° C. and a specific gravity of 1.40 or less at 23° C., which is obtained by curing the plastic composition of the present invention.

The present invention (VIII) is a plastic lens having a refractive index of 1.58 or more at 25° C., a specific gravity of 1.40 or less at 23° C., a carbon concentration by elemental analysis of 50.0 to 70.0% by mass and a bromine concentration by elemental analysis of 9.0 to 15.0% by mass.

The present invention (IX) is a process for producing the plastic lens of the present invention.

BEST MODE FOR CARRYING OUT THE INVENTION

Figure 1:
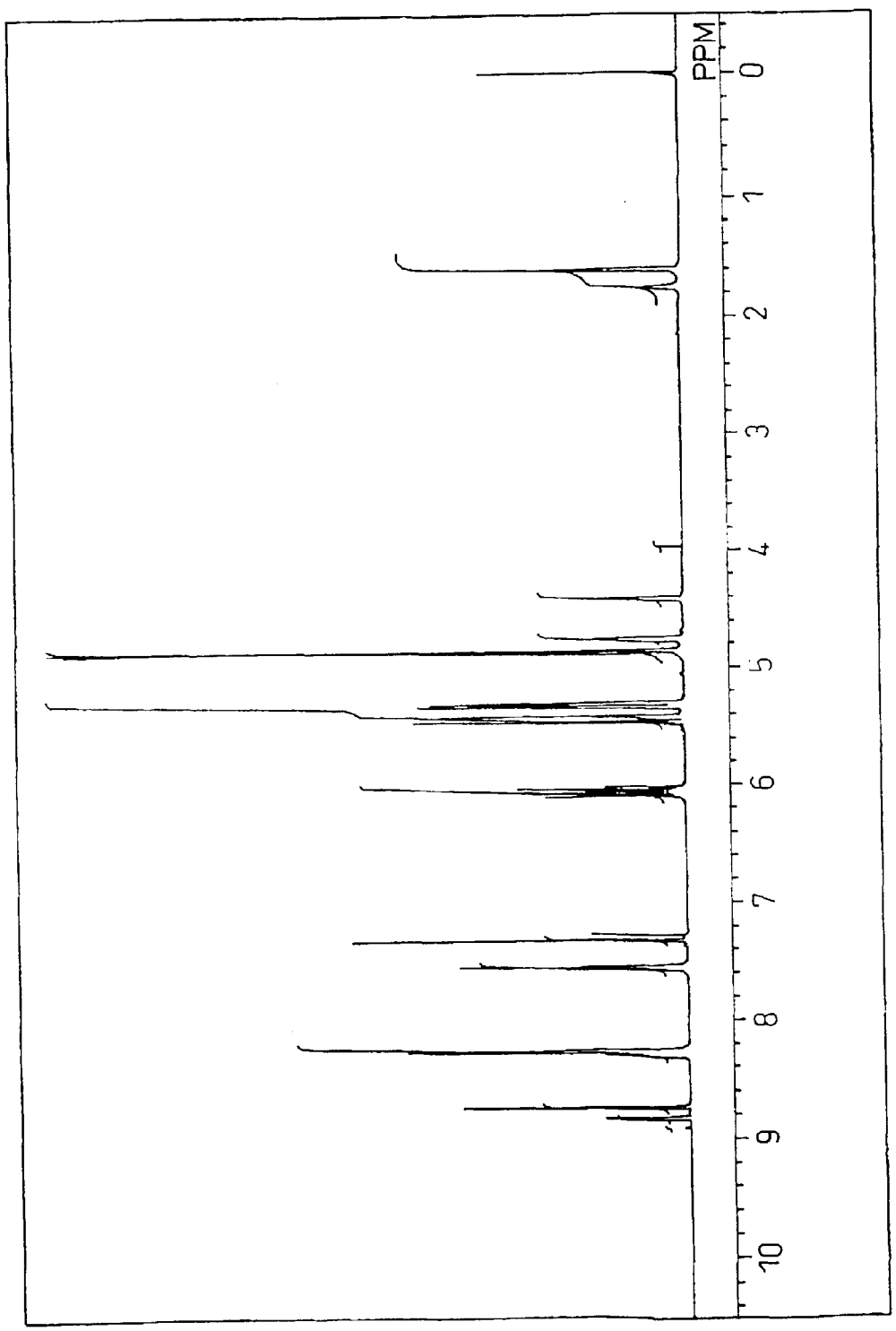
FIG. 1 is 400 MHz $^1$H-NMR spectrum chart of the allyl ester compound produced in Production Example 1.

The plastic lens compositions of the present invention (I), the present invention (II) and the present invention (III) are described below. The present invention (I) relates to a plastic lens composition comprising a component (α) shown below as an essential component, wherein a cured material obtained by curing the composition has a refractive index of 1.58 or more at 25° C. and a specific gravity of 1.40 or less at 23° C.:

Component (α)
  a compound having at least one group represented by formula (1) above as a terminal group and a group represented by formula (2) above as a repeating unit.

The present invention (II) relates to a plastic lens composition comprising a component (α) and a component (β), shown below, wherein a cured material obtained by curing the composition has a refractive index of 1.58 or more at 25° C. and a specific gravity of 1.40 or less at 23° C.:

Component (α)
  a compound having at least one group represented by formula (1) above as a terminal group and a group represented by formula (2) above as a repeating unit, in an amount of 10 to 60% by mass based on all the curable components;

Component (β)
  at least one compound selected from the group consisting of compounds represented by formulae (3) and (4) above, in an amount of 10 to 90% by mass based on all the curable components.

The present invention (III) relates to a plastic lens composition comprising a component (α), a component (β) and a component (γ), shown below, wherein a cured material obtained by curing the composition has a refractive index of 1.58 or more at 25° C. and a specific gravity of 1.40 or less at 23° C.:

Component (α)
  a compound having at least one group represented by formula (1) above as a terminal group and a group represented by formula (2) above as a repeating unit, in an amount of 10 to 60% by mass based on all the curable components;

Component (β)
  at least one compound selected from the group consisting of compounds represented by formulae (3) and (4) above, in an amount of 10 to 90% by mass based on all the curable components;

Component (γ)
at least one compound selected from the group consisting of dibenzyl maleate, diphenyl maleate, dibenzyl fumarate, diphenyl fumarate, (meth)allyl 2-phenylbenzoate, (meth)allyl 3-phenylbenzoate, (meth)allyl 4-phenylbenzoate, (meth)allyl α-naphthoate, (meth)allyl β-naphthoate, (meth)allyl o-chlorobenzoate, (meth)allyl m-chlorobenzoate, (meth)allyl p-chlorobenzoate, (meth)allyl 2,6-dichlorobenzoate, (meth)allyl 2,4-dichlorobenzoate, (meth)allyl o-bromobenzoate, (meth)allyl m-bromobenzoate and (meth)-allyl p-bromobenzoate, in an amount of 0 to 20% by mass based on whole curable components.

The term "whole curable components" as used in the present invention means the total amount of polymerizable components contained in the plastic lens composition of the present invention (I), (II) or (III).

In formula (1), each $R^1$ independently represents an allyl group or a methallyl group. Also, in formula (1), each $A^1$ independently represents an organic residue derived from a dicarboxylic acid or a carboxylic anhydride. In formula (2), each $A^2$ independently represents an organic residue derived from a dicarboxylic acid or a carboxylic anhydride. Furthermore, in formula (2), each X is independently an organic residue and the X's represent one or more organic residues containing, as an essential component, an organic residue derived from a bromine-containing compound having two or more hydroxyl groups.

The moieties represented by $R^1$ in the terminal group represented by formula (1) as an essential component of the plastic lens composition of the present invention (I), (II) or (III), may all be occupied by an allyl group or a methallyl group or may be partially occupied by an allyl group and in other parts, by a methallyl group.

$A^1$ in formula (1) and $A^2$ in formula (2) each represents an organic residue derived from a dicarboxylic acid or a carboxylic anhydride. The "dicarboxylic acid or carboxylic anhydride" include the following compounds, however, needless to say, the present invention is not limited to these specific examples.

Examples thereof include aliphatic dicarboxylic acids and anhydrides thereof, such as succinic acid, succinic anhydride, glutaric acid, glutaric anhydride, adipic acid, malonic acid, malonic anhydride, 2-methylsuccinic acid and 2-methylsuccinic anhydride; dicarboxylic acids having an alicyclic structure and anhydrides thereof, such as 1,4-cyclohexanedicarboxylic acid, 1,3-cyclohexanedicarboxylic acid, 1,2-cyclohexanedicarboxylic acid, 1,2-cyclohexanedicarboxylic anhydride, 4-methylcyclohexane-1,2-dicarboxylic acid and 4-methylcyclohexane-1,2-dicarboxylic anhydride; and aromatic dicarboxylic acids and anhydrides thereof, such as terephthalic acid, isophthalic acid, phthalic acid, phthalic anhydride, biphenyl-2,2'-dicarboxylic acid (hereinafter sometimes referred to as "diphenic acid"), biphenyl-2,2'-dicarboxylic anhydride, biphenyl-3,3'-dicarboxylic acid and biphenyl 4,4'-dicarboxylic acid.

Among these, from the standpoint of maintaining a high refractive index of the compound, preferred are aromatic dicarboxylic acids and acid anhydrides thereof, such as terephthalic acid, isophthalic acid, phthalic acid, phthalic anhydride, biphenyl-2,2'-dicarboxylic acid, biphenyl-2,2'-dicarboxylic anhydride, biphenyl-3,3'-dicarboxylic acid and biphenyl-4,4'-dicarboxylic acid, more preferred are isophthalic acid, biphenyl-2,2'-dicarboxylic acid and biphenyl-2,2'-dicarboxylic anhydride.

The moieties represented by $A^1$ in the terminal group represented by formula (1) in the component (α) as an essential component of the plastic lens composition of the present invention (I), (II) or (III), or the moieties represented by $A^2$ in the repeating unit represented by formula (2) in the component (α) as an essential component of the plastic lens composition of the present invention (I), (II) or (III) (hereinafter "$A^1$" and "$A^2$" are collectively referred to as "A"), may all be occupied by organic residues derived from dicarboxylic acids or carboxylic anhydrides having the same structure, may all be occupied by organic residues derived from dicarboxylic acids or carboxylic anhydrides having different structures, or may partially be occupied by organic residues derived from dicarboxylic acids having the same structure and in other parts by organic residues derived from dicarboxylic acids having different structures.

More specifically, in the following structural formula (5) which is one example of the component (α) as an essential component of the plastic lens composition of the present invention (I), (II) or (III), A's in the number k contained in the structure are independent of each other:

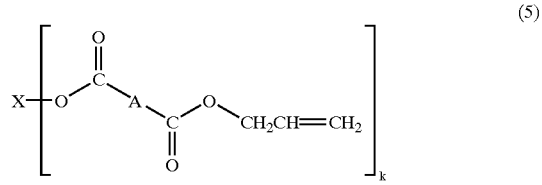

(5)

wherein each A independently represents an organic residue derived from a dicarboxylic acid, k represents an integer of 2 or more, and X represents an organic residue derived from a bromine-containing compound having two or more hydroxyl groups.

In structural formula (5), for example, A's in the number k may all be organic residues derived from dicarboxylic acids or dicarboxylic anhydrides having different structures (that is, one organic residue is derived from respective dicarboxylic acids or dicarboxylic anhydrides having k kinds of structures) or all may be organic residues derived from dicarboxylic acids or dicarboxylic anhydrides having the same structure (that is, organic residues in the number of k are derived from dicarboxylic acids having one kind of structure). A mixed structure where some of the A's in the number k are organic residues derived from dicarboxylic acids or dicarboxylic anhydrides having the same structure and some others are organic residues derived from dicarboxylic acids or dicarboxylic anhydrides having different structures, may also be used.

The term "reach X is independently an organic residue" as used herein means that in the following structural formula (6) as one example of the component (α) containing the repeating units represented by formula (2), the X's in the number m contained in the repeating structure are organic residues independently of each other:

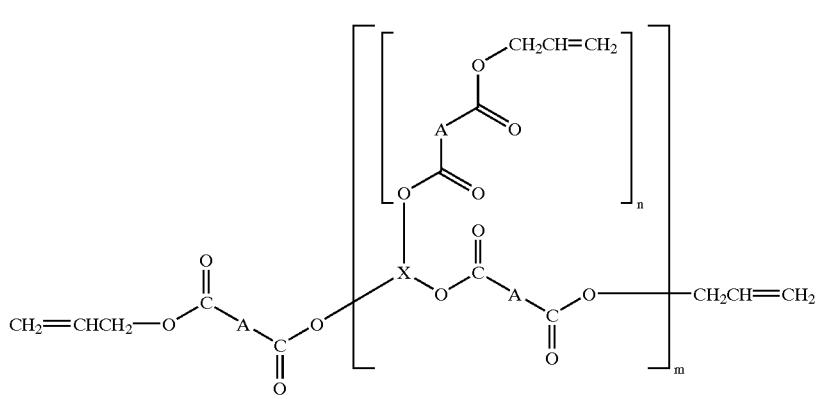

wherein each X is independently an organic residue and the X's represent one or more organic residues containing, as an essential component, an organic residue derived from a bromine-containing compound having two or more hydroxyl groups, m represents 0 or an integer of 1 or more, n represents 0 or an integer of 1 or more, and each A independently represents an organic residue derived from a dicarboxylic acid or dicarboxylic anhydride.

For example, in structural formula (6), X's in the number m may all be organic residues derived from different bromine-containing compounds (that is, one organic residue is derived from respective bromine-containing compounds of m kinds) or all may be organic residues derived from the same bromine-containing compound (that is, organic residues in the number m are derived from one kind of bromine-containing compound). A mixed structure where some of the X's in the number m are organic residues derived from the same bromine-containing. compound and some others are organic residues derived from different kinds of bromine-containing compounds, may also be used. Moreover, in this mixed structure, the whole may be completely random or a part may be repeated.

The term "one or more organic residues containing, as an essential component, an organic residue derived from a bromine-containing compound having two or more hydroxyl groups" as used herein means that, in structural formula (6) as one example of the component ($\alpha$) containing the repeating units represented by formula (2), a part or all of the X's in the number m contained in the repeating structures contain an organic residue derived from a bromine-containing compound.

For example, in structural formula (6), the X's in the number m may all be an organic residue derived from a bromine-containing compound (that is, organic residues in the number of m derived from at least one bromine-containing compound) or may have a mixed structure where some of the X's in the number m are an organic residue derived from a bromine-containing compound and some others are an organic residue derived from another kind of compound. Furthermore, in the mixed structure, the whole may be completely random or a part may be repeated.

By the ester bonding, X can have a branched structure containing the formula (1) as a terminal group and the formula (2) as a repeating unit. More specifically, for example, when an organic residue derived from 2,4,6-tribromo-1,3,5-tri(hydroxyethyl)benzene as one example of a trihydric bromine-containing alcohol is present in X, the component ($\alpha$) as an essential component of the plastic lens composition of the present invention (I), (II) or (III) can have a partial structure represented by the following structural formula (7):

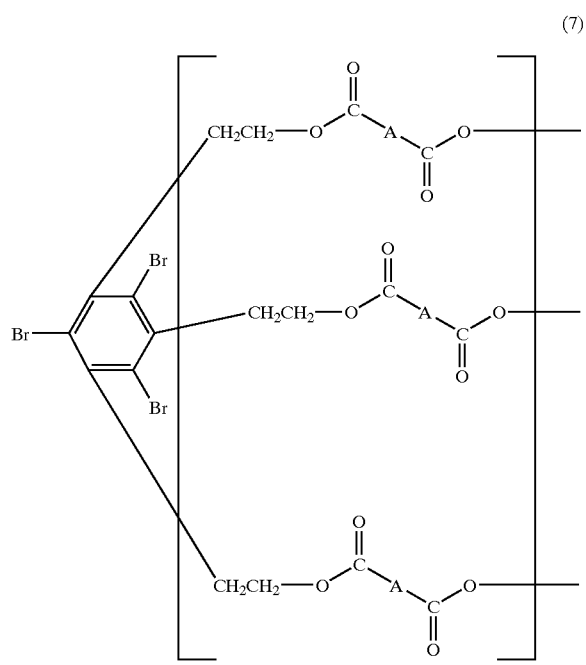

Each X is, of course, independently an organic residue and the X's represent one or more organic residues containing, as an essential component, an organic residue derived from a bromine-containing compound having two or more hydroxyl groups. Also, each A independently represents an organic residue derived from a dicarboxylic acid or dicarboxylic anhydride.

In formula (2), each X is independently an organic residue and the X's represent one or more organic residues containing, as an essential component, an organic residue derived from a bromine-containing compound having two or more hydroxyl groups. Examples of the "bromine-containing compound having two or more hydroxyl groups" as referred to herein include the following. Needless to say, however, the present invention is not limited to these specific examples.

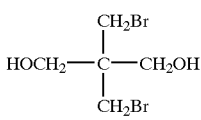
(8)

Also, a bromine-containing compound having two or more hydroxyl groups, represented by the following formula (9) or (10) may be used:

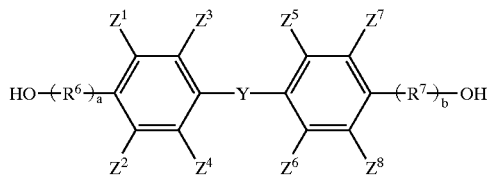
(9)

wherein each $R^6$ independently represents an organic group represented by structural formula (11), (12) or (13) shown below, each $R^7$ independently represents a group selected from the groups of structural formulae (14) to (16) shown below, a and b each independently represents 0 or an integer of 1 to 10, $Z^1$, $Z^2$, $Z^3$, $Z^4$, $Z^5$, $Z^6$, $Z^7$ and $Z^8$ each independently represents a substituent selected from the group consisting of bromine, chlorine and hydrogen, provided that at least one of $Z^1$, $Z^2$, $Z^3$, $Z^4$, $Z^5$, $Z^6$, $Z^7$ and $Z^8$ is bromine, and Y represents an organic group represented by structural formula (17) or (18) shown below.

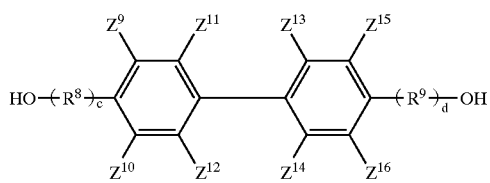
(10)

wherein each $R^8$ independently represents an organic group represented by structural formula (19), (20) or (21) shown below, each $R^9$ represents a group selected from the groups of structural formulae (22) to (24) shown below, c and d each independently represents 0 or an integer of 1 to 10, and $Z^9$, $Z^{10}$, $Z^{11}$, $Z^{12}$, $Z^{13}$, $Z^{14}$, $Z^{15}$ and $Z^{16}$ each independently represents a substituent selected from the group consisting of bromine, chlorine and hydrogen, provided that at least one of $Z^9$, $Z^{10}$, $Z^{11}$, $Z^{12}$, $Z^{13}$, $Z^{14}$, $Z^{15}$ and $Z^{16}$ is bromine.

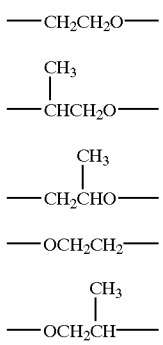

(11)

(12)

(13)

(14)

(15)

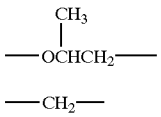
(16)

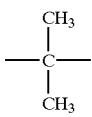
(17)

(18)

(19)

(20)

(21)

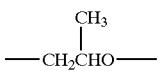
(22)

(23)

(24)

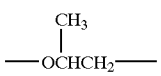

In formula (9), $R^6$s in the number a may all be organic groups having the same structure, may all be organic groups having different structures, or may all be partially organic groups having the same structure with the remaining being organic groups having different structures, where, however, $R^6$ must be selected from the organic groups represented by structural formulae (11) to (13).

In formula (9), $R^7$s in the number of b all may be organic groups having the same structure, all may be organic groups having different structures or may be partially organic groups having the same structure with the remaining being organic groups having different structures, where, however, $R^7$ must be selected from the organic groups represented by structural formulae (14) to (16).

In formula (9), a and b each independently represents 0 or an integer of 1 to 10. Y represents an organic group represented by structural formula (17) or (18).

Specific examples of the bromine-containing compound having two or more hydroxyl groups, represented by formula (9) include 2,2-bis[4-(2-hydroxyethoxy)-3,5-dibromophenyl]-propane, 2,2-bis[4-(2-hydroxypropoxy)-3,5-dibromophenyl]-propane, 3 mol ethylene oxide adducts of 2,2-bis(3,5-dibromo-4-hydroxyphenyl)propane, 4 mol propylene oxide adducts of 2,2-bis(3,5-dibromo-4-hydroxyphenyl)propane, bis[4-(2-hydroxyethoxy)-3,5-dibromophenyl]methane, bis[4-(2-hydroxypropoxy)-3,5-dibromophenyl]methane, 3 mol ethylene oxide adducts of bis(3,5-dibromo-4-hydroxyphenyl)methane, and 4 mol propylene oxide adducts of bis(3,5-dibromo-4-hydroxyphenyl) methane. Needless to say, however, the present invention is not limited to these specific examples.

Among these bromine-containing compounds, from the standpoint that raw materials are easily available, 2,2-bis[4-(2-hydroxyethoxy)-3,5-dibromophenyl]propane and 2,2-bis [4-(2-hydroxypropoxy)-3,5-dibromophenyl]propane are preferred, and 2,2-bis[4-(2-hydroxyethoxy)-3,5-dibromophenyl]propane is more preferred.

In formula (10), $R^8$s in the number c may all have be organic groups having the same structure, all may be organic groups having different structures, or all may be partially organic groups having the same structure with the remaining being organic groups having different structures, where, however, $R^8$ must be selected from the organic groups represented by structural formulae (19) to (21).

In formula (10), $R^9$s in the number d may all be organic groups having the same structure, all may be organic groups having different structures or all may be partially organic groups having the same structure with the remaining being organic groups having different structures, where, however, $R^9$ must be selected from the organic groups represented by structural formulae (22) to (24).

In formula (10), c and d each independently represents 0 or an integer of 1 to 10.

Specific examples of the bromine-containing compound having two or more hydroxyl groups, represented by formula (10) include 4,4'-bis(2-hydroxyethoxy)-3,3',5,5'-tetrabromodiphenyl, 4,4'-bis(2-hydroxypropoxy)-3,3',5,5'-tetrabromodiphenyl, 3 mol ethylene oxide adducts of 4,4'-dihydroxy-3,3',5,5'-tetrabromodiphenyl and 3 mol propylene oxide adducts of 4,4'-dihydroxy-3,3',5,5'-tetrabromo-diphenyl. Needless to say, however, the present invention is not limited to these specific examples.

Among these bromine-containing compounds, from the standpoint that raw materials are easily available, 4,4'-bis(2-hydroxyethoxy)-3,3',5,5'-tetrabromodiphenyl and 4,4'-bis(2-hydroxypropoxy)-3,3',5,5'-tetrabromodiphenyl are preferred, and 4,4'-bis(2-hydroxyethoxy)-3,3',5,5'-tetrabromodiphenyl is more preferred.

In combination with the bromine-containing compound having two or more hydroxyl groups, another alcohol may also be used. Specific examples thereof include the following compounds, however, needless to say, the present invention is not limited to these specific examples.

Examples thereof include 1,4-di(hydroxymethyl)benzene, 1,3-di(hydroxymethyl)benzene, 1,2-di(hydroxymethyl)benzene, bis[4-(2-hydroxyethoxy)phenyl]methane, 1,1-bis[4-(2-hydroxyethoxy)phenyl]cyclohexane, 2,2-bis[4-(2-hydroxyethoxy)phenyl]propane, bis[4-(2-hydroxypropoxy)phenyl]-methane, 1,1-bis[4-(2-hydroxypropoxy)phenyl]cyclohexane, 2,2-bis[4-(2-hydroxypropoxy)phenyl]propane, 3 mol ethylene oxide adducts of bisphenol A, 4 mol ethylene oxide adducts of bisphenol F, 3 mol ethylene oxide adducts of bisphenol Z, 1,4-bis(2-hydroxyethoxy)benzene, 1,3-bis(2-hydroxyethoxy)-benzene, 1,2-bis(2-hydroxyethoxy)benzene, 4,4'-bis(2-hydroxyethoxy)diphenyl, 3,3'-bis(2-hydroxyethoxy)diphenyl and 2,2'-bis(2-hydroxyethoxy)diphenyl.

The repeating number of the group represented by formula (2) which is a repeating unit of the component ($\alpha$) as an essential component of the present invention (I), (II) or (III) is not particularly limited. A mixture of materials having various repeating numbers may also be used. Furthermore, a compound having a repeating number of 0 (namely, the compound represented by formula (25)) and a compound having a repeating number of an integer of 1 or more may be used in combination. However, use of only a compound having a repeating number of 0 is disadvantageous in achieving the object of the present invention.

In the present invention, it is defined that the remaining compound represented by formula (25) is not contained in the component ($\alpha$) which is an essential component of the plastic lens composition of the present invention (I), (II) or (III).

More specifically, when diallyl isophthalate is used as a raw material in the production of the component ($\alpha$) and the diallyl isophthalate remains, the remaining diallyl isophthalate is not contained in the component ($\alpha$) but is contained in the component ($\beta$) which is an essential component of the composition of the present invention (II) or (III).

Also, when diallyl succinate is used as a raw material in the production of the component ($\alpha$) and the diallyl succinate remains, the remaining diallyl succinate is not contained in either the component ($\alpha$) or the component ($\beta$).

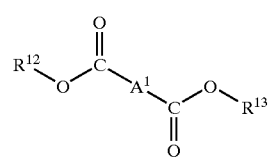

(25)

wherein A represents an organic residue derived from a dicarboxylic acid or a carboxylic anhydride, and $R^{12}$ and $R^{13}$ each independently represents an allyl group or a methallyl group.

In formula (25), A represents an organic residue derived from a dicarboxylic acid or a carboxylic anhydride. Examples of the "dicarboxylic acid or carboxylic anhydride" as referred to herein include the following compounds, however, needless to say, the present invention is not limited to these specific examples.

Examples thereof include aliphatic dicarboxylic acids and anhydrides thereof, such as succinic acid, succinic anhydride, glutaric acid, glutaric anhydride, adipic acid, malonic acid, malonic anhydride, 2-methylsuccinic acid and 2-methylsuccinic anhydride; dicarboxylic acids having an alicyclic structure and anhydrides thereof, such as 1,4-cyclohexanedicarboxylic acid, 1,3-cyclohexanedicarboxylic acid, 1,2-cyclohexanedicarboxylic acid, 1,2-cyclohexanedicarboxylic anhydride, 4-methylcyclohexane-1,2-dicarboxylic acid and 4-methylcyclohexane-1,2-dicarboxylic anhydride; and aromatic dicarboxylic acids and anhydrides thereof, such as terephthalic acid, isophthalic acid, phthalic acid, phthalic anhydride, biphenyl-2,2'-dicarboxylic acid, biphenyl-2,2'-dicarboxylic anhydride, biphenyl-3,3'-dicarboxylic acid and biphenyl 4,4'-dicarboxylic acid.

Among these, from the standpoint of maintaining a high refractive index of the compound, preferred are aromatic dicarboxylic acids and acid anhydrides thereof, such as terephthalic acid, isophthalic acid, phthalic acid, phthalic anhydride, biphenyl-2,2'-dicarboxylic acid, biphenyl-2,2'-dicarboxylic anhydride, biphenyl-3,3'-dicarboxylic acid and biphenyl-4,4'-dicarboxylic acid, more preferred are isophthalic acid, biphenyl-2,2'-dicarboxylic acid and biphenyl-2,2'-dicarboxylic anhydride.

The repeating number of the group represented by formula (2) which is a repeating unit of the component ($\alpha$) as an essential component of the present invention (I), (II) or (III) is usually an integer of preferably 1 to 30. If a component ($\alpha$) comprising only a compound having a repeating number in excess of 30 is used for the plastic lens composition, the allyl group concentration may decrease and this is disadvantageous in that, at the time of curing, the curing may be retarded or a part of the compound may remain uncured to reduce the physical properties such as mechanical properties of the cured material and furthermore, the viscosity may be extremely increased. In all compounds contained in the component ($\alpha$), the repeating number is preferably an integer of 1 to 30, more preferably from 1 to 20, still more preferably from 1 to 10.

In the production of the component ($\alpha$) which is an essential component of the plastic lens composition of the present invention (I), (II) or (III), the compound represented by formula (25) as a raw material may remain depending on the production conditions but the component may be used as it is for the plastic lens composition without removing the compound represented by formula (25). However, when the component is used for the plastic lens composition of the present invention (I), (II) or (III), it is disadvantageous to allow the compound represented by formula (25) to be present in excess of 90% by mass based on whole curable components, because the bromine content is excessively reduced and the refractive index of the cured material becomes excessively small.

The amount of the component (α) blended in the plastic lens composition of the present invention is preferably from 10 to 60% by mass, more preferably from 15 to 50% by mass, still more preferably from 20 to 45% by mass, based on whole curable components.

If the amount of the component (α) blended in the plastic lens composition of the present invention is less than 10% by mass based on whole curable components, the cured material obtained by curing the plastic lens composition can hardly maintain a refractive index of 1.58 or more and an Abbe number of 30 or more and this is not preferred. On the other hand, if the amount of the component (α) blended in the plastic lens composition of the present invention exceeds 60% by mass based on whole curable components, the viscosity of the composition is extremely increased and, at the same time, the specific gravity of the cured material is very likely to exceed 1.40, which are not preferred.

In the composition of the present invention, a component (β) is preferably used for the purpose of adjusting the viscosity of the composition and at the same time, maintaining a refractive index of 1.58 or more of the cured material.

The proportion of the compound represented by formula (3) or (4) varies depending on the kind of the compound used but this compound is preferably in the range of 10 to 90% by mass, more preferably from 40 to 80% by mass, still more preferably from 50 to 80% by mass, based on whole curable components. If the proportion of the compound represented by formula (3) or (4) is less than 10% by mass based on whole curable components, the viscosity of the composition excessively increases and this is not preferred. On the other hand if the proportion of the compound represented by formula (3) or (4) exceeds 90% by mass based on whole curable components, the cured material obtained by curing the plastic lens composition can hardly maintain a refractive index of 1.58 or more and an Abbe number of 30 or more and this is also not preferred.

The "Abbe number" as used in the present invention is a value indicating the degree of dispersion of optical glass and the details thereon are described in *Butsurigaku Jiten— Shukusho Ban—(Encyclopedia of Physics— smaller edition—)*, 1st ed., 3rd imp., Item "Abbe Su (Abbe Number)", edited by Butsuri Kagaku Jiten Henshu Iinkai, published by Baifukan (Nov. 30, 1989).

The Abbe number value described in the present invention is a value measured by "Abbe Refractometer 1T" manufactured by Atago K.K. and represented by the following formula:

Abbe number $(v_D)=(n_D-1)/(n_F-n_C)$ wherein $n_D$, $n_F$ and $n_C$ represent refractive indexes at 25° C. for the d line (wavelength: 578.6 nm), the F line (486.1 nm) and the C line (656.3 nm) of Fraunhofer, respectively.

The component (α) as an essential component of the plastic lens composition of the present invention (I), (II) or (III) can be produced, for example, by the following method.

Using at least one compound represented by formula (9) at a constant ratio, transesterification is performed in the presence of a catalyst between this compound and one or more bromine-containing compounds containing, as an essential component, at least one bromine-containing compound having two or more hydroxyl groups, whereby the objective compound can be obtained. Of course, the present invention is not limited thereto and a step such as purification may be provided, if desired.

The catalyst for use in the transesterification step is not particularly limited as long as it is a catalyst which can be used for transesterification in general. An organic metal compound is particularly preferred and specific examples thereof include tetraisopropoxy titanium, tetrabutoxy titanium, dibutyltin oxide, dioctyltin oxide, hafnium acetylacetonate and zirconium acetylacetonate, however, the present invention is not limited thereto. Among these, dibutyltin oxide and dioctyltin oxide are preferred.

The reaction temperature in this step is not particularly limited but is preferably from 100 to 230° C., more preferably 120 to 200° C. In the case where a solvent is used, the reaction temperature is sometimes limited by the boiling point of the solvent.

In this step, a solvent is usually not used, however, a solvent may be used, if desired. The solvent which can be used is not particularly limited as long as it does not inhibit the transesterification. Specific examples thereof include benzene, toluene, xylene and cyclohexane, but the present invention is not limited thereto. Among these, benzene and toluene are preferred. However, as described above, the step may be performed without using a solvent.

In order to obtain the component (α) as an essential component of the plastic lens composition of the present invention, the total number of carboxylates in the compound represented by formula (25) must be larger than the total number of hydroxyl groups in one or more bromine-containing compounds containing, as an essential component, at least one bromine-containing compound having two or more hydroxyl groups. If the ratio of the total number of carboxylates in the compound represented by formula (25) to the total number of hydroxyl groups in the bromine-containing compound is excessively close to 1/1, the produced component (α) has an extremely large number average molecular weight and cannot be used for the plastic lens composition of the present invention (I), (II) or (III). The ratio of the total number of carboxylates in the compound represented by formula (25) to the total number of hydroxyl groups in the bromine-containing compound is preferably from 4/3 to 10/1, more preferably from 3/2 to 8/1, still more preferably 2/1 to 7/1.

Mainly for the purpose of adjusting the viscosity of the composition, one or more compounds copolymerizable with the component (α) or (β) may be added to the plastic lens composition of the present invention (I), (II) or (III), within the range of not exceeding 20% by mass based on whole curable components contained in the plastic lens composition of the present invention, and this is preferred.

Examples of this compound include monomers having a (meth)acryl group, a vinyl group or a (meth)allyl group. Specific examples thereof include methyl (meth)acrylate, isobornyl (meth)acrylate, vinyl acetate, vinyl benzoate, diphenyl maleate, dibenzyl maleate, dibutyl maleate, dimethoxyethyl maleate, diphenyl fumarate, dibenzyl fumarate, dibutyl fumarate and dimethoxyethyl fumarate.

The "(meth)acryl" as used in the present invention includes acryl and methacryl and the "(meth)acrylate" includes acrylate and methacrylate.

Examples of the monomer having a (meth)allyl group include (meth)allyl α-naphthoate, (meth)allyl β-naphthoate, (meth)allyl 2-phenylbenzoate, (meth)allyl 3-phenylbenzoate, (meth)allyl 4-phenylbenzoate, (meth) allyl benzoate, (meth)allyl o-chlorobenzoate, (meth)allyl m-chlorobenzoate, (meth)allyl p-chlorobenzoate, (meth) allyl 2,6-dichloro-benzoate, (meth)allyl 2,4-dichlorobenzoate, (meth)allyl 2,4,6-trichlorobenzoate, (meth)allyl o-bromobenzoate, (meth)allyl m-bromobenzoate, (meth)allyl p-bromobenzoate, (meth) allyl 2,6-dibromobenzoate, (meth)allyl 2,4-dibromobenzoate, (meth)allyl 2,4,6-tribromobenzoate, di(meth)allyl 1,4-cyclohexanedicarboxylate, di(meth)allyl 1,3-cyclohexanedicarboxylate, di(meth)allyl 1,2-cyclohexanedicarboxylate, di(meth)allyl 4-cyclohexene-1, 2-dicarboxylate, di(meth)allyl 1-cyclohexene-1,2-dicarboxylate, di(meth)allyl 3-methyl-1,2-cyclohexanedicarboxylate, di(meth)allyl 4-methyl-1,2-cyclohexanedicarboxylate, di(meth)allyl bicyclo[2.2.1] hepto-5-ene-2,3-dicarboxylate, di(meth)allyl chlorendate and di(meth)allyl 3,6-methylene-1,2-cyclohexanedicarboxylate. In addition, polyethyleneglycol bis((meth)allyl carbonate) resin represented by CR-39 (trade name, produced by PPG) may also be used. Needless to say, the present invention is not limited to these specific examples and other monomers and the like may be used within the range of not impairing the physical properties of the plastic lens obtained by curing the composition.

Among the above-mentioned compounds copolyzable with the component (α) or component (β), when taking the balance of the reduction of the specific gravity and the maintenance of the high refractive index of the cured material into consideration, preferred compounds may include dibenzyl maleate, diphenyl maleate, dibenzyl fumarate, diphenyl fumarate, (meth)allyl 2-phenylbenzoate, (meth)allyl 3-phenylbenzoate, (meth)allyl 4-phenylbenzoate, (meth)allyl α-naphthoate, (meth)allyl β-naphthoate, (meth)allyl o-chlorobenzoate, (meth)allyl m-chlorobenzoate, (meth)allyl p-chlorobenzoate, (meth) allyl 2,6-dichlorobenzoate, (meth)allyl 2,4-dichlorobenzoate, (meth)allyl o-bromobenzoate, (meth)allyl m-bromobenzoate and (meth)allyl p-bromobenzoate, with dibenzyl maleate, diphenyl maleate, dibenzyl fumarate, diphenyl fumarate, (meth)allyl 2-phenylbenzoate, (meth) allyl 3-phenylbenzoate, (meth)allyl 4-phenylbenzoate, (meth)allyl α-naphthoate and (meth)allyl β-naphthoate being particularly preferred.

The "(meth)allyl" as used in the present invention includes allyl and methallyl.

The plastic lens composition of the present invention (I), (II) or (III) is characterized in that the cured material obtained by curing the composition must have a refractive index ($n_D$) at 25° C. of 1.58 or more, preferably 1.585 or more. If the refractive index ($n_D$) of the cured material is less than 1.58 at 25° C., the objective high refractive index lens cannot be obtained.

The "refractive index" as used in the present invention means a ratio c/υ of the velocity c of light in vacuum to the phase velocity υ in the medium and the details thereon are described in Butsurigaku Jiten— Shukusho Ban— (Encyclopedia of Physics—smaller edition—), 1st ed., 3rd imp., Item "Kussetsu Ritsu (Refractive Index)", edited by Butsuri Kagaku Jiten Henshu Iinkai, published by Baifukan (Nov. 30, 1989).

The refractive index value described in the present invention is a refractive index for the d line (wavelength: 587.6 nm) of Fraunhofer measured at 25° C. using "Abbe Refractometer 1T" manufactured by Atago K.K. The measurement principle of the refractive index in the "Abbe Refractometer 1T" manufactured by Atago K.K. is a method of measuring critical angles of all reflections and the details thereon are described in Butsurigaku Jiten—Shukusho Ban— (Encyclopedia of Physics—smaller edition—), 1st ed., 3rd imp., "(1) Zen Hansha-no Rinkai Kaku-wo Sokutei-suru Hoho ((1) Method for Measuring Critical Angles of All Reflections" of Item "Kussetsu Kei (Refractometer)", edited by Butsuri Kagaku Jiten Henshu Iinkai, published by Baifukan (Nov. 30, 1989).

The plastic lens composition of the present invention (I), (II) or (III) is characterized in that the cured material obtained by curing the composition must have a specific gravity of 1.40 or less at 23° C., preferably 1.39 or less. If the specific gravity of the cured material obtained by curing the composition exceeds 1.40 at 23° C., the objective lightweight plastic lens cannot be obtained.

The "specific gravity" as used in the present invention is a ratio of the mass of a substance to the mass of a standard substance (water at 4° C. and standard atmospheric pressure) having the same volume as the substance and the details thereof are described in Butsurigaku Jiten—Shukusho Ban—(Encyclopedia of Physics —smaller edition—), 1st ed., 3rd imp., Item "Hijyu (Specific Gravity)", edited by Butsuri Kagaku Jiten Henshu Iinkai, published by Baifukan (Nov. 30, 1989).

The specific gravity value of the cured material described in the present invention is a value measured by the sink-and-float method (measurement temperature: 23° C.) according to JIS K 7112.

The plastic lens composition of the present invention (IV) is described below. The present invention (IV) is the plastic lens composition of the present invention (I), (II) or (III) which further comprises an ultraviolet absorbent and/or a light stabilizer in an amount of 0.01 to 2 parts by mass per 100 parts by mass of whole curable components in the plastic lens composition.

In the plastic lens composition of the present invention (IV), an ultraviolet absorbent or a light stabilizer is used for the purpose of improving the weather resistance. The ultraviolet absorbent and light stabilizer are not particularly limited as long as it is blended in the composition but specific examples thereof include the compounds shown below. However, needless to say, the present invention is not limited to these specific examples.

The "ultraviolet absorbent" as used in the present invention means a material which absorbs light energy of sunlight or fluorescent light and converts it into heat energy or the like. The "light stabilizer" as used in the present invention means a material which traps radicals generated due to photooxidation deterioration.

Specific examples of the ultraviolet absorbent include the compounds having a benzotriazole structure unit represented by the following structural formula (26):

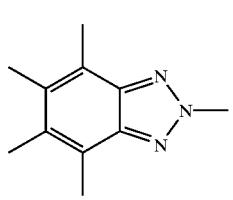

(26)

Specific examples of the compound having the above-described structure unit include the compounds represented by the following structural formulae (27) to (42):

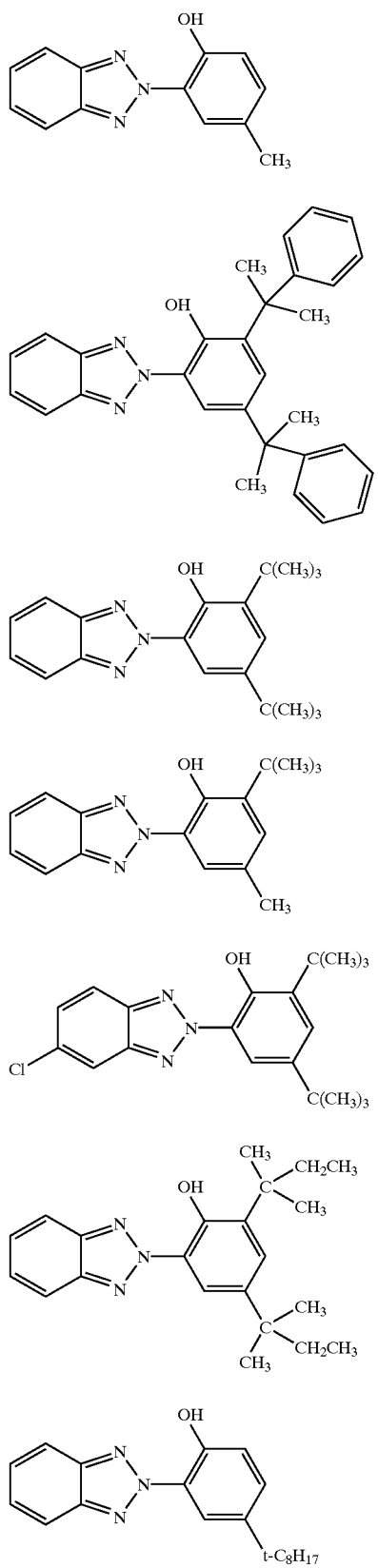
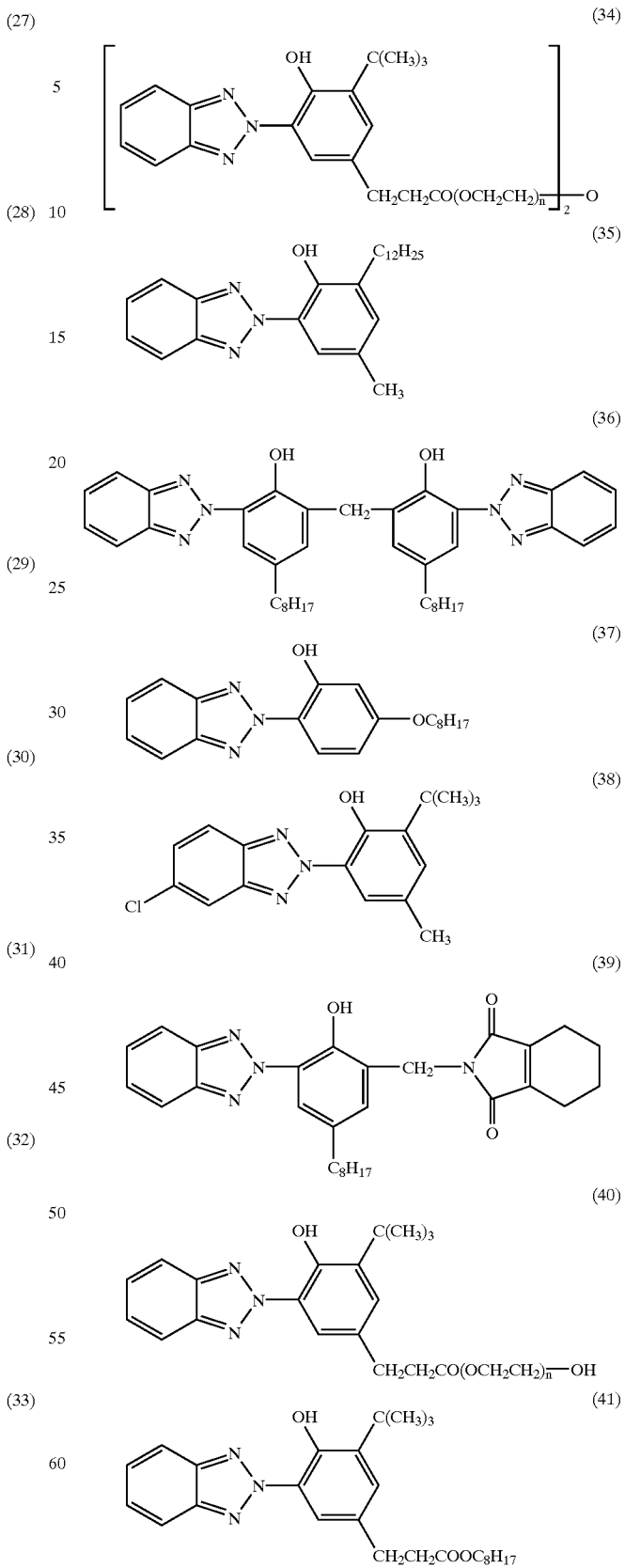

(42)

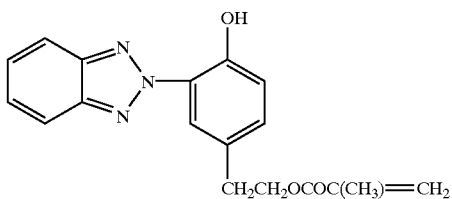

Specific examples of the benzophenone-based ultraviolet absorbent include the compounds represented by the following structural formulae (43) to (47):

(43)

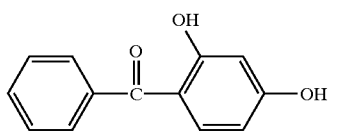

(44)

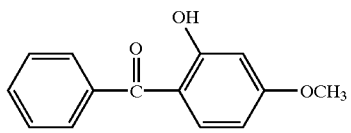

(45)

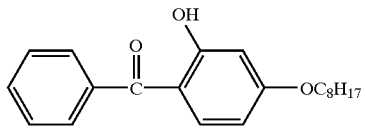

(46)

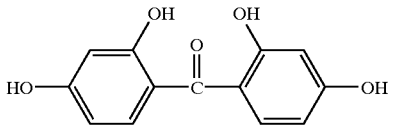

(47)

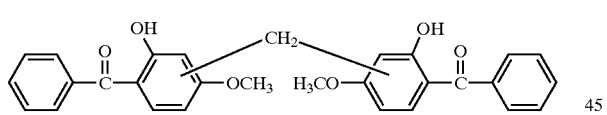

In addition, traizine-based ultraviolet absorbents represented by the following structural formula (48) and oxanilide-based ultraviolet absorbents represented by the following structural formula (49) may also be used.

(48)

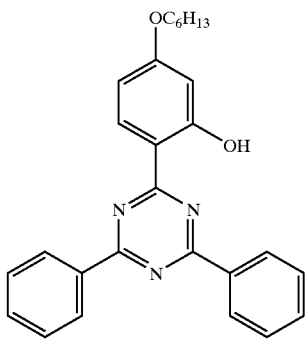

(49)

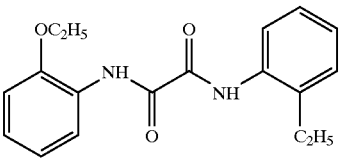

Specific examples of the light stabilizer include hindered amine-based light stabilizers (hereinafter simply referred to as "HALS") represented by the following structural formulae (50) to (56), (58), (60) and (62) to (65):

(50)

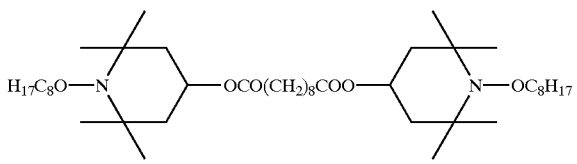

(51)

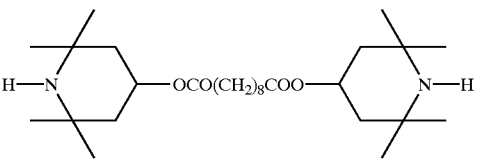

(52)

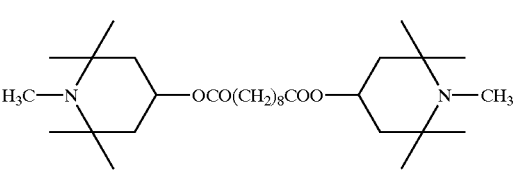

(53)

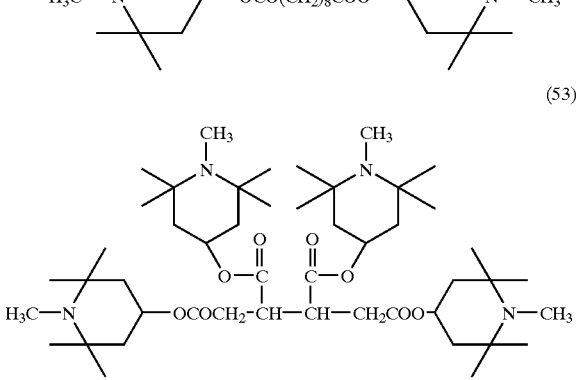

(54)

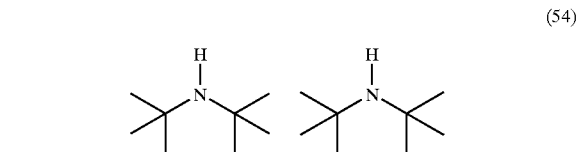

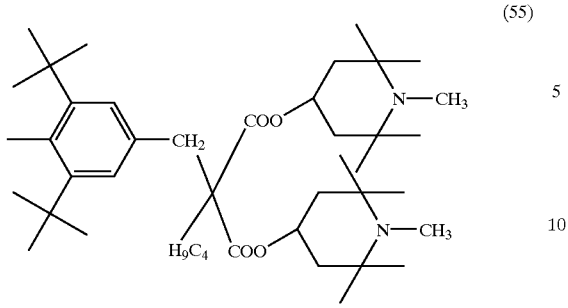
(55)
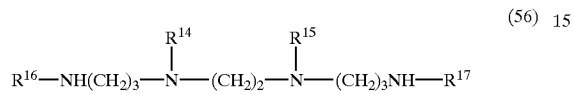
(56)
wherein $R^{14}$, $R^{15}$, $R^{16}$ and $R^{17}$ each represents —H or
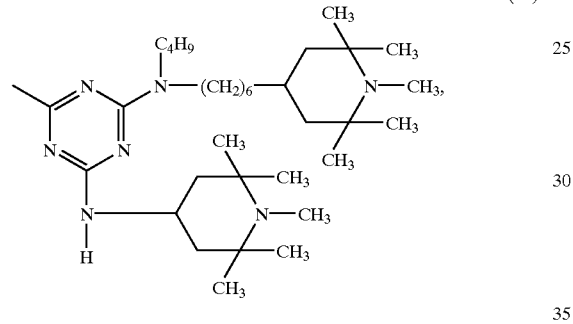
(57)
provided that the case where $R^{14}$, $R^{15}$, $R^{16}$ and $R^{17}$ all are a hydrogen atom is excluded.
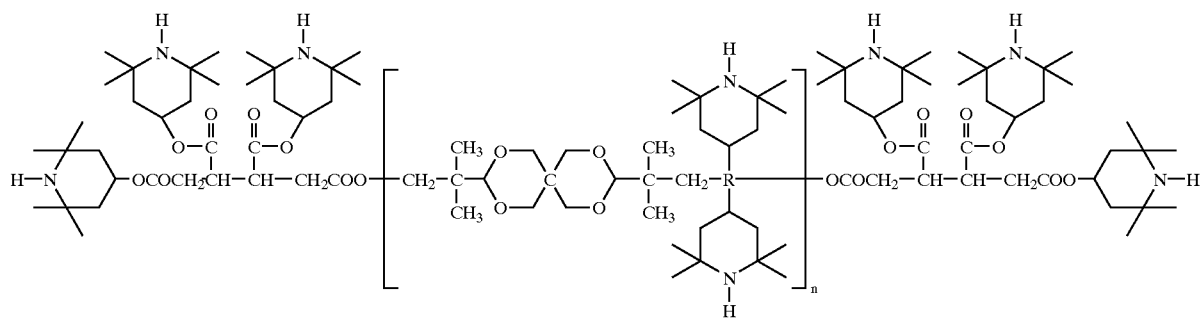
(58)
wherein R is an organic residue represented by the following structural formula (59).
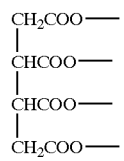
(59)

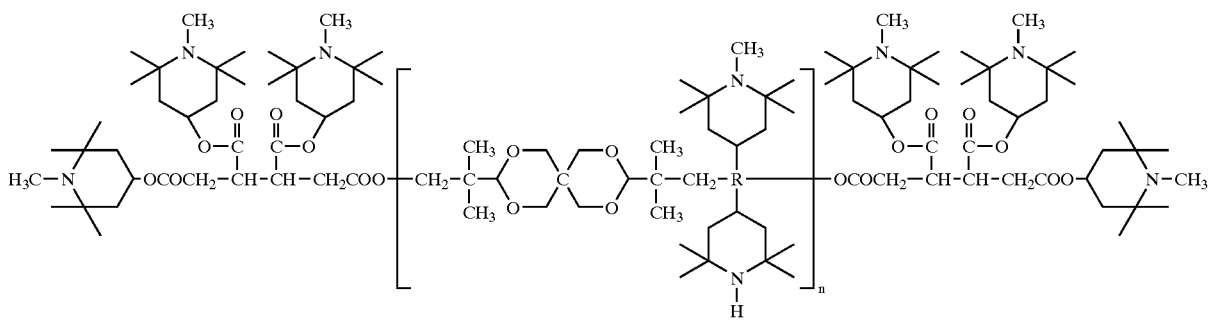
(60)

wherein R is an organic residue represented by the following structural formula (61).

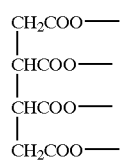
(61)

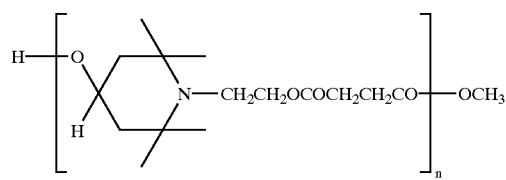
(62)

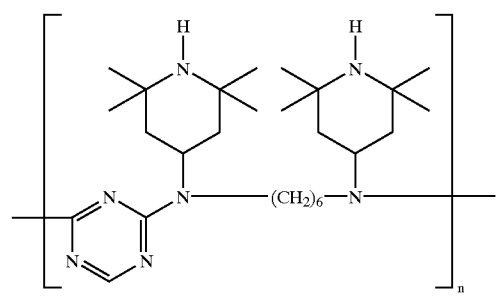
(63)

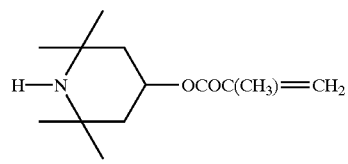
(64)

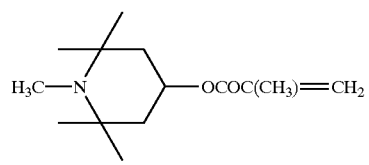
(65)

When the ultraviolet absorbent or light stabilizer is added, good curing can be surely attained as compared with the non-addition system but depending on the compound, coloring occurs during the curing.

Among these ultraviolet absorbents and light stabilizers, on considering the effect of improving the weather resistance of the cured material and the degree of coloration at the time of curing the plastic lens composition of the present invention (V), the benzotriazole-based ultraviolet absorbent is preferred.

In particular, those having a hindered phenol structure within the molecule, such as structural formulae (28) to (32), (34), (38), (40) and (41), and those having a polymerizable unsaturated group, such as structural formula (42) are more preferred.

The ultraviolet absorbents or the light stabilizers may be used individually or in combination, or one or more ultraviolet absorbent and one or more light stabilizer may also be used in combination.

The amount of the ultraviolet absorbent or light stabilizer is preferably used in an amount of 0.001 to 2% by mass, more preferably from 0.05 to 1.5% by mass, based on whole curable components. If the amount added is less than 0.05% by mass, the effect of preventing deterioration may not be fully brought out and also, use in excess of 2% by mass is not preferred in view of coloration during the curing or of profitability.

The plastic lens composition of the present invention (V) is described below. The present invention (V) is the plastic lens composition of the present invention (I), (II), (III) or (IV) which further comprises an antioxidant in an amount of 0.01 to 5 parts by mass per 100 parts by mass of whole curable components in the plastic lens composition.

Examples of the antioxidant which can be used include phenol-based antioxidant, phosphite-based antioxidant and thioether-based antioxidant. These antioxidants in different systems may be used individually, two or more antioxidants in the same system may be used in combination, or two or more antioxidants in different systems may also be used in combination.

Specific examples of the phenol-based antioxidant include the following compounds:

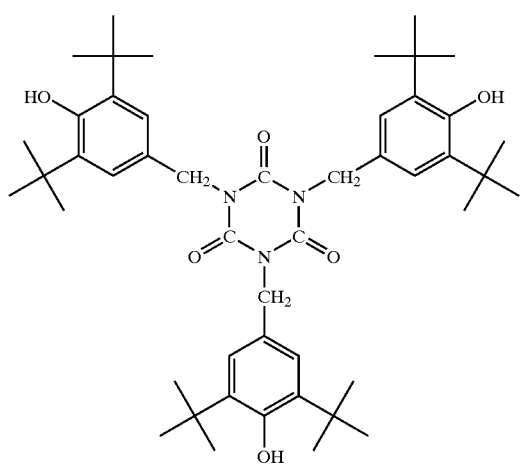
(66)
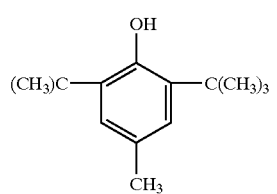
(67)
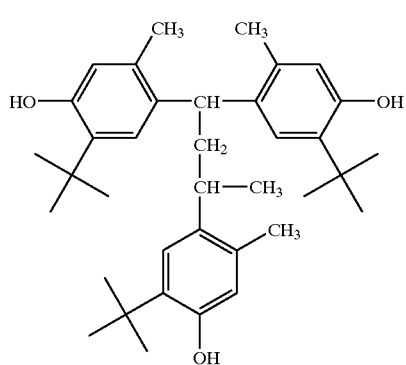
(68)
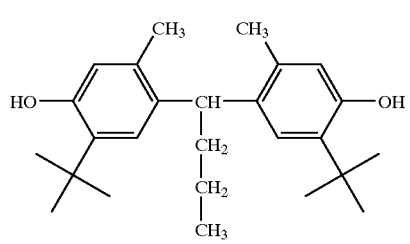
(69)
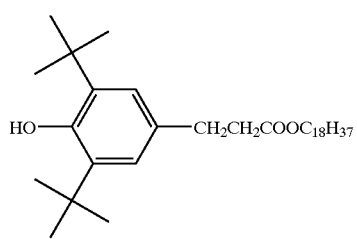
(70)
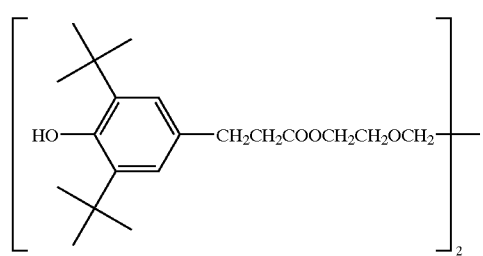
(71)
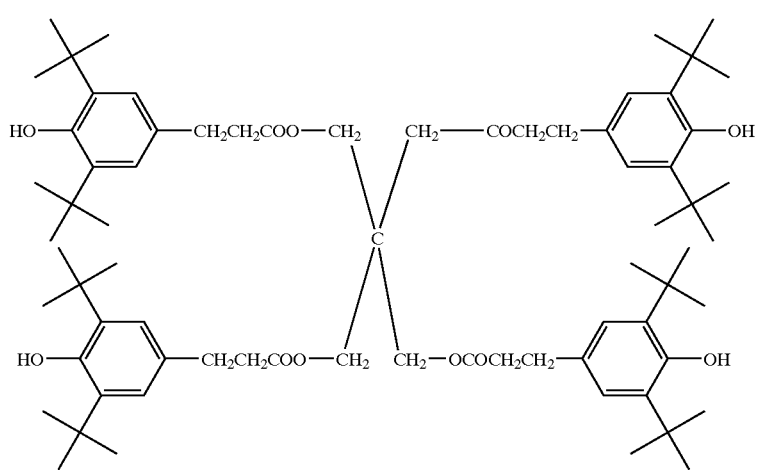
(72)

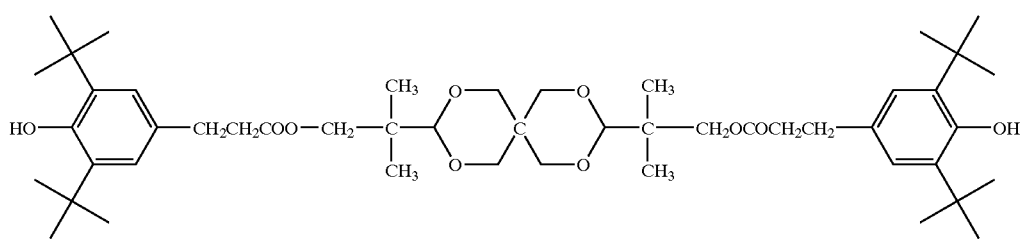
(73)
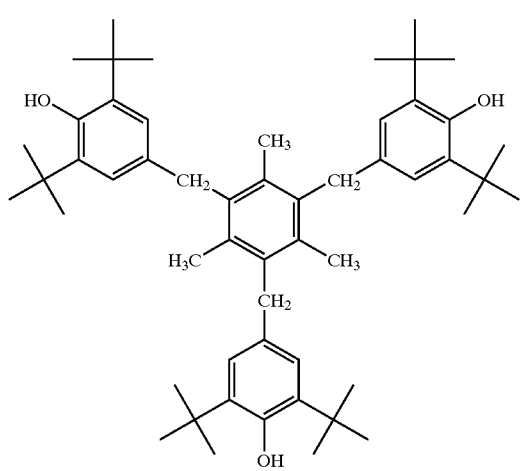
(74)
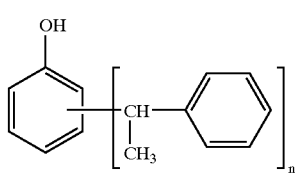
(75)
Specific examples of the phosphite-based antioxidant include the following compounds.
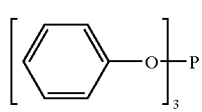
(76)
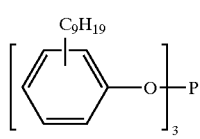
(77)
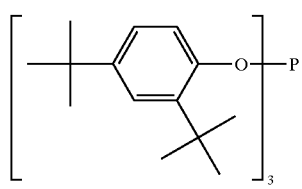
(78)
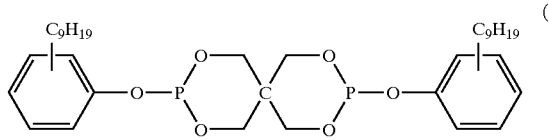
(79)
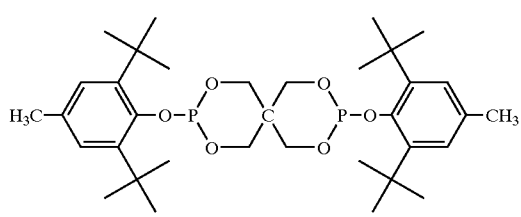
(80)
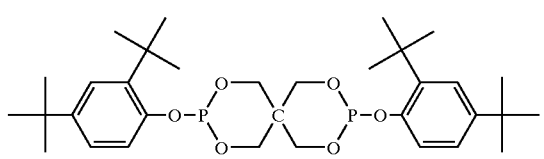
(81)

(82)
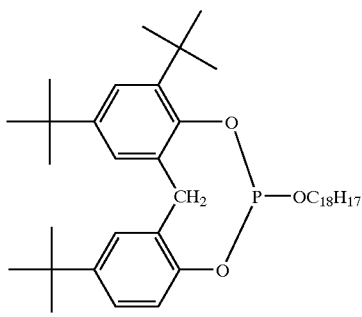

(83)
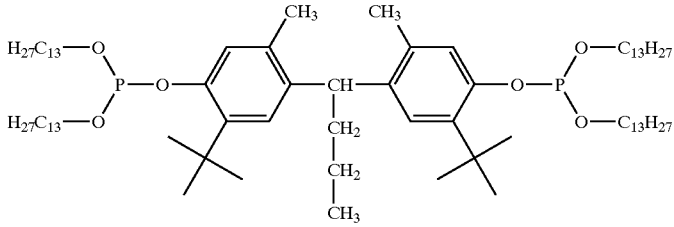

(84)
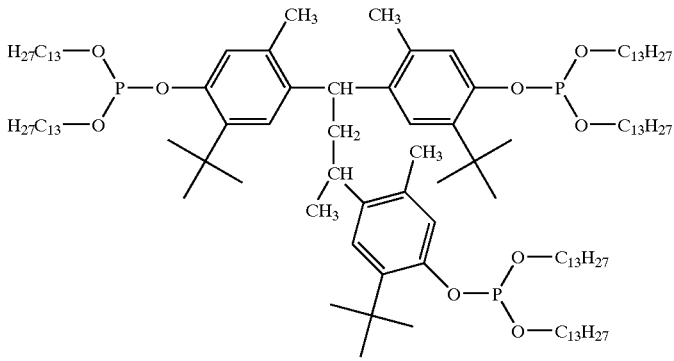

(85)
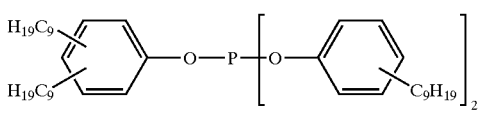

(86)
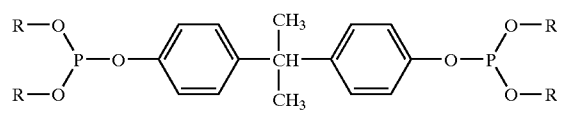

wherein R is a $C_{12}$ to $C_{15}$ alkyl group.

wherein R is a $C_{12}$ to $C_{15}$ alkyl group.

(87)
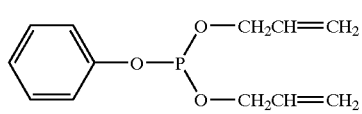

(89)
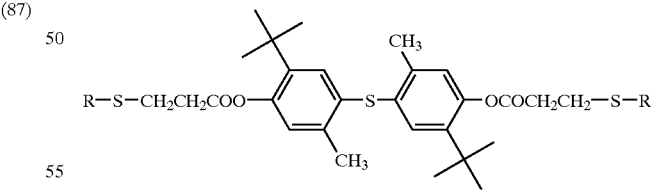

wherein R is a $C_{12}$ to $C_{15}$ alkyl group.

Specific examples of the thioether-based antioxidant include the following compounds.

(88)
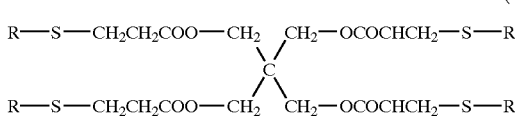

$H_{25}C_{12}$—OCOCH$_2$CH$_2$—S—CH$_2$CH$_2$COO—C$_{12}$H$_{25}$ (90)

$H_{27}C_{13}$—OCOCH$_2$CH$_2$—S—CH$_2$CH$_2$COO—C$_{13}$H$_{27}$ (91)

$H_{29}C_{14}$—OCOCH$_2$CH$_2$—S—CH$_2$CH$_2$COO—C$_{14}$H$_{29}$ (92)

$H_{37}C_{18}$—OCOCH$_2$CH$_2$—S—CH$_2$CH$_2$COO—C$_{18}$H$_{37}$ (93)

Among these antioxidants, considering that the antioxidant preferably does not cause coloration and curing inhibition, phosphite-based antioxidants are preferred, and phosphite-based antioxidants in which an aryloxy group and an alkoxy group or an alkenyloxy group both are bonded to the same phosphor atom are more preferred, such as structural formulae (79) to (84), (86) and (87).

This antioxidant can be used in combination with the ultraviolet absorbent or light stabilizer.

The amount of the antioxidant used is preferably from 0.01 to 5% by mass, more preferably from 0.1 to 3% by mass, based on whole curable components. If the amount added is less than 0.01% by mass, the effect of preventing the deterioration may not be fully brought out and, also, use of the antioxidant in excess of 5% by mass may be disadvantageous in view of profitability.

The plastic lens composition of the present invention may contain a fluorescent brightening agent such as 2,5-bis[5-tert-butylbenzoxazolyl(2)].

The plastic lens composition of the present invention (VI) is described below. The present invention (VI) is the plastic lens composition of the present invention (I), (II), (III), (IV) or (V) which further comprises at least one radical polymerization initiator in an amount of 0.1 to 10 parts by mass per 100 parts by mass of whole curable components in the plastic lens composition.

The plastic lens composition of the present invention (VI) may contain a radical polymerization initiator as a curing agent and this is preferred.

The radical polymerization initiator which can be added to the plastic lens composition of the present invention (VI) is not particularly limited and a known radical polymerization initiator may be used as long as it does not adversely affect the physical values such as optical properties of the plastic lens obtained by curing the composition.

The radical polymerization initiator for use in the present invention is, however, preferably soluble in other components present in the composition to be cured and at the same time, generates free radicals at 30 to 120° C. Specific examples of the radical polymerization initiator which can be added include diisopropylperoxy dicarbonate, dicyclohexylperoxy dicarbonate, di-n-propylperoxy dicarbonate, di-sec-butylperoxy dicarbonate and tert-butyl perbenzoate, but the present invention is not limited thereto. In view of the curability, radical polymerization initiators having a structure represented by the following formula (94) are preferred.

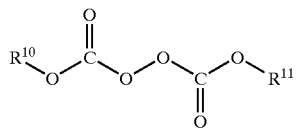

(94)

wherein $R^{10}$ and $R^{11}$ each independently represents a group selected from the group consisting of an alkyl group having from 1 to 10 carbon atoms, a substituted alkyl group, a phenyl group and a substituted phenyl group.

Specific examples of the radical polymerization initiator represented by formula (94) include di-n-propylperoxy dicarbonate, diisopropylperoxy dicarbonate, bis(4-tert-butylcyclohexyl)peroxy dicarbonate, di-2-ethoxy-ethylperoxy dicarbonate, di-2-ethylhexylperoxy bicarbonate, di-3-methoxybutylperoxy dicarbonate, di-sec-butylperoxy dicarbonate and di(3-methyl-3-methoxybutyl) peroxy dicarbonate.

Among these, preferred are di-n-propylperoxy dicarbonate, diisopropylperoxy bicarbonate, di-2-ethoxy-ethylperoxy dicarbonate, di-2-ethylhexylperoxy dicarbonate and di(3-methyl-3-methoxybutyl)peroxy bicarbonate, more preferred is diisopropylperoxy dicarbonate.

The amount of the radical polymerization initiator added is from 0.1 to 10 parts by mass, preferably from 1 to 5 parts by mass, per 100 parts by mass of whole curable components contained in the plastic lens composition of the present invention (I), (II), (III), (IV) or (V). If the amount added is less than 0.1 parts by mass, the curing of the composition may insufficiently proceed. Also, the addition in excess of 10 parts by mass is not preferred in view of profitability.

On considering the filterability (namely, filtering rate) and the casting the work (namely, flowability into a mold and filling rate) of the composition, the viscosity at 25° C. of the plastic lens composition of the present invention (I), (II), (III), (IV), (V) or (VI) may generally be 500 mPa·s or less, preferably 400 mPa·s or less, still more preferably 300 mPa·s or less.

The "viscosity" as used herein is a value measured by a rotational viscometer and the details on the rotational viscometer are described in *Iwanami Rikagaku Jiten, Dai 3-Pan* (*Encyclopedia of Physics and Chemistry, 3rd Ed.*), 3rd ed., 8th imp. (Jun. 1, 1977).

The plastic lens composition of the present invention (I), (II), (III), (IV), (V) or (VI) may contain additives generally used for improving the capability of plastic lens, such as coloring agent (e.g., dye, pigment) and mold-releasing agent.

Examples of the coloring agent include organic pigments such as anthraquinone type, azo type, carbonium type, quinoline type, quinoneimine type, indigoid type and phthalocyanine type; organic dyes such as azoic dye and sulfur dye; and inorganic pigments such as titanium yellow, yellow iron oxide, zinc yellow, chrome orange, molybdenum red, cobalt violet, cobalt blue, cobalt green, chromic oxide, titanium oxide, zinc sulfide and carbon black.

Examples of the mold-releasing agent include stearic acid, butyl stearate, zinc stearate, stearic acid amide, fluorine-containing compounds and silicone compounds.

The total amount of additives added, such as coloring agent (e.g., dye, pigment) and mold-releasing agent, is preferably 1% by mass or less based on whole curable components contained in the plastic lens resin composition of the present invention.

The present invention (VII) is described below. The present invention (VII) is a plastic lens obtained by curing the plastic lens composition of any one of the present inventions (I) to (VI).

The plastic lens of the present invention (VII) must have a refractive index ($n_D$) at 25° C. of 1.58 or more, preferably 1.585 or more. If the refractive index ($n_D$) at 25° C. of the cured material is less than 1.58, the objective high-refractive index lens cannot be obtained.

Furthermore, the plastic lens of the present invention (VII) must have a specific gravity at 23° C. of 1.40 or less, preferably 1.39 or less. If the specific gravity of the cured material obtained by curing the composition exceeds 1.40 at 23° C., the objective lightweight plastic lens cannot be obtained.

The present invention (VIII) is described below. The present invention (VIII) is a plastic lens having a refrative index of 1.58 or more at 25° C., a specific gravity of 1.40 or less at 23° C., a carbon concentration by elemental analysis of 50.0 to 70.0% by mass and a bromine concentration by elemental analysis of 9.0 to 15.0% by mass.

As in the plastic lens of the present invention (VII), the refractive index ($n_D$) at 25° C. of the plastic lens of the present invention (VIII) must be 1.58 or more, preferably 1.585 or more. If the refractive index ($n_D$) at 25° C. of the cured material is less than 1.58, the objective high-refractive index lens cannot be obtained.

Further, as in the plastic lens of the present invention (VII), the specific gravity at 23° C. of the plastic lens of the present invention (VIII) must be 1.40 or less, preferably 1.39 or less. If the specific gravity at 23° C. of the cured material exceeds 1.40, the objective lightweight plastic lens cannot be obtained.

Furthermore, the cured material constituting the plastic lens of the present invention (VIII) has a carbon concentration by elemental analysis in a range of 50.0 to 70.0% by mass and a bromine concentration by elemental analysis in a range of 9.0 to 15.0% by mass.

If the carbon concentration by elemental analysis is less than 50.0% by mass, the proportion of the other elements such as bromine, which cause to increase the specific gravity of the cured material, are relatively increased so that the cured material becomes to have high specific gravity. If the carbon concentration by elemental analysis is more than 70.0% by mass, the refractive index of the cured material lowers or the Abbe number of the cured material becomes too low. Preferably, the carbon concentration by elemental analysis is 52.0 to 68.0% by mass, particularly 55.0 to 65.0% by mass.

If the bromine concentration by elemental analysis is less than 9.0% by mass, the refractive index of the cured material lowers or the Abbe number of the cured material becomes too low. If the bromine concentration by elemental analysis is more than 15.0% by mass, the specific gravity of the cured material becomes high. Preferably, the bromine concentration by elemental analysis is 10.0 to 14.0% by mass, particularly 10.5 to 13.5% by mass.

The carbon concentration and bromine concentration by elemental analysis are preferably 50.0 to 70.0% by mass and 9.0 to 15.0% by mass, more preferably 52.0 to 68.0% by mass and 10.0 to 14.0% by mass, particularly 55.0 to 65.0% by mass and 10.5 to 13.5% by mass, respectively.

The present invention (IX) is described below. The present invention (IX) is-a process for producing a plastic lens, comprising curing the plastic lens composition of any one of the present inventions (I) to (VI).

In the present invention, the mold-processing of the plastic lens composition is suitably performed by cast molding. More specifically, a molding process comprising adding a radical polymerization initiator to the composition, filling the composition into a mold fixed by an elastomer gasket or spacer through a line, and heat-curing it in an oven may be used.

The construction material used here as a mold is a metal or glass. In general, the mold for plastic lenses must be cleaned after the cast-molding and such cleaning is usually performed using a strong alkali solution or a strong acid. Unlike metal, glass is scarcely changed in the quality by the cleaning and can be easily polished and thereby extremely reduced in the surface roughness and therefore, glass is preferably used.

The curing temperature at the time of molding the plastic lens composition of any one of the present inventions (I) to (VI) is from about 30 to 120° C., preferably from 40 to 100° C. On taking account of shrinkage or strain at the curing, the curing temperature is preferably controlled by a method allowing the curing to gradually proceed while elevating the temperature. The curing time may generally be from 0.5. to 100 hours, preferably from 3 to 50 hours, more preferably from 10 to 30 hours.

The plastic lens of the present invention can be dyed, similarly to normal plastic lenses. The method for dyeing the plastic lens of the present invention is not particularly limited and any method may be used as long as it is a known dyeing method for plastic lenses. Among these, a dip dyeing method conventionally known as a general method is preferred.

The "dip dyeing method" as used herein means a method of dispersing a disperse dye together with a surfactant in water to prepare a dyeing liquid and dipping a plastic lens in this dyeing liquid under heating, thereby dyeing the plastic lens.

The method for dyeing the plastic lens is not limited to this dip dyeing method but other known methods may be used, for example, a method of sublimating an organic pigment and thereby dyeing a plastic lens (see, Japanese Examined Patent Publication No. 35-1384 (JP-B-35-1384)) or a method of sublimating a sublimable dye and thereby dyeing a plastic lens (see, Japanese Examined Patent Publication No. 56-159376 (JP-B-56-159376) and No. 1-277814 (JP-B-1-277814)) may be used. In view of simple operation, the dip dyeing method is most preferred.

The present invention is described in greater detail below by referring to the Examples, however, the present invention should not be construed as being limited thereto.

Various physical properties were measured as follows.

1. Refractive Index ($n_D$) and Abbe Number ($\upsilon_D$)

A test piece of 9 mm×16 mm×4 mm was prepared and measured on the refractive index ($n_D$) and Abbe number ($\upsilon_D$) at 25° C. using "Abbe Refractometer 1T" manufactured by Atago K.K. The contact solvent used was α-bromonaphthalene.

2. Viscosity

In Comparative Example 2, 5.2 ml of a specimen was charged into a specified attachment vessel and the viscosity was measured at a temperature of 25° C. by a B-Type Viscometer (Model B8U) manufactured by Tokyo Keiki Co., Ltd. using an HH-1 rotor at a rotation number of 50 rpm.

In Examples 1 to 9 and Comparative Example 1, 300 g of a specimen was charged into a 300-ml tall beaker and the viscosity was measured at 25° C. by a B-Type Viscometer (Model BH) manufactured by Tokyo Keiki Co., Ltd. using a No. 1 rotor at a rotation number of 20 rpm. The measurement temperature was 25° C.

3. Barcol Hardness

The Barcol hardness was measured using Model 934-1 according to JIS K 6911.

4. Measurement of Specific Gravity of Cured Material

The specific gravity of the cured material after the curing was measured by the sink-float method (at 23° C.) of JIS K 7112.

5. Evaluation of Color of Cured Material

The L value, the a value and the b value of a 4 mm-thich cured material was measured in the uniform sensory color space of Hunter (Hunter Lab-space) using an SM Color Computer (Model SM-4) manufactured Suga Shikenki K.K. Here, L indicates lightness and a and b each indicates the perceived color.

The details on the Hunter uniform sensory color space are described in *Shin-Hen Shikisai Kagaku Handbook* (*Newly Compiled Handbook of Color Science*), Item "Hunter no Kinto Chikaku Iro-Kukan (Uniform Sensory Color Space of Hunter)", 2nd imp., page 137, published by Tokyo University Shuppan Kai (Jul. 31, 1980).

Production Example 1

Figure 2:
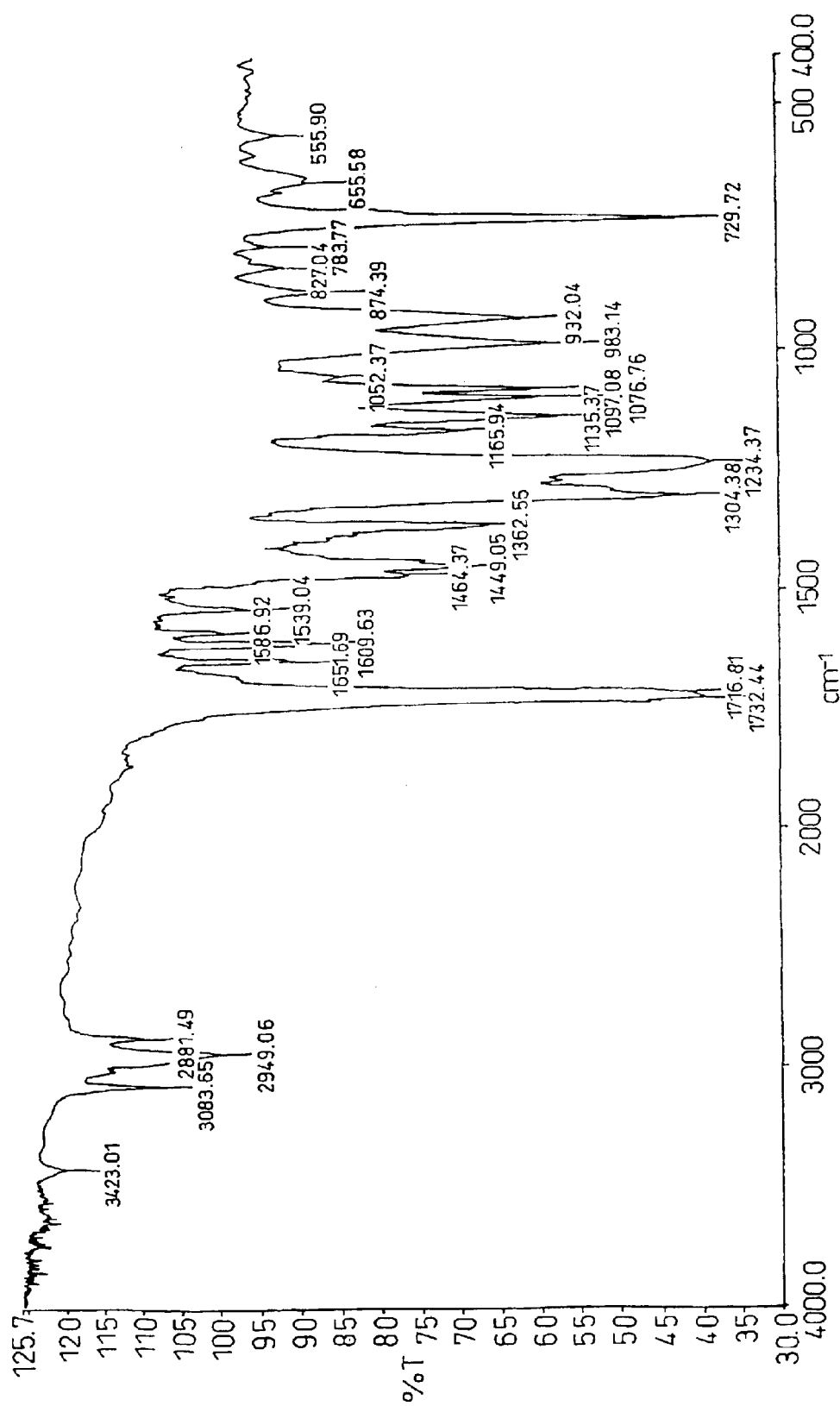
FIG. 2 is FT-IR spectrum chart of the allyl ester compound produced in Production Example 1.

Into a 3 liter three-neck flask with a distillation unit, 1,477.6 g (6.0 mol) of diallyl isophthalate, 632.0 g (1.0 mol)

of 2,2-bis[4-(2-hydroxyethoxy)-3,5-dibromophenyl] propane and 1.4776 g (0.1% by mass based on diallyl isophthalate) of dibutyltin oxide were charged. The system was heated at 180° C. in a nitrogen stream to distill off the allyl alcohol generated. When about 81 g of allyl alcohol was distilled off, the pressure inside the reaction system was reduced to 1.33 kPa to accelerate the distillation of allyl alcohol. After a theoretical amount (116.2 g) of allyl alcohol was distilled off, the system was heated for another one hour and then kept at 190° C. and 0.13 kPa for one hour. Thereafter, the reactor was cooled, and as a result, 1,993 g of an allyl ester compound was obtained (hereinafter referred to as "Sample A"). FIG. 1 and FIG. 2 show 400 MHz $^1$H-NMR spectrum (solvent: CDCl$_3$) and FT-IR spectrum of Sample A, respectively.

Sample A was analyzed by gas chromatography (GC-14B manufactured by Shimadzu Kagaku Co., Ltd., hydrogen flame ionization detector, column used: OV-17 of 0.5 m, the temperature condition: 160° C. and constant) and found to contain 55% by mass of diallyl isophthalate.

Production Example 2

In the same manner as in Production Example 1, except for using 1,477.6 g of diallyl terephthalate in place of 1,477.6 g of diallyl isophthalate, 1,993 g of an allyl ester compound was obtained (hereinafter referred to as "Sample B").

Sample B was analyzed by gas chromatography (GC-14B manufactured by Shimadzu Kagaku Co., Ltd., hydrogen flame ionization detector, column used: OV-17 of 0.5 m, the temperature condition: 160° C. and constant) and found to contain 55% by mass of diallyl terephthalate.

Production Example 3

Into a 2 liter three-neck flask with a distillation unit, 738.8 g (3.0 mol) of diallyl isophthalate, 632.0 g (1.0 mol) of 2,2-bis[4-(2-hydroxyethoxy)-3,5-dibromophenyl]propane and 0.7388 g (0.1% by mass based on diallyl isophthalate) of dibutyltin oxide were charged. The system was heated at 180° C. in a nitrogen stream to distill off the allyl alcohol generated. When about 81 g of allyl alcohol was distilled off, the pressure inside the reaction system was reduced to 1.33 kPa to accelerate the distillation of allyl alcohol. After a theoretical amount (116.2 g) of allyl alcohol was distilled off, the system was heated for another one hour and then kept at 190° C. and 0.13 kPa for one hour. Thereafter, the reactor was cooled and, as a result, 1,254.6 g of an allyl ester compound was obtained (hereinafter referred to as "Sample C").

Sample C was analyzed by gas chromatography (GC-14B manufactured by Shimadzu Kagaku Co., Ltd., hydrogen flame ionization detector, column used: OV-17 of 0.5 m, the temperature condition: 160° C. and constant) and found to contain 25% by mass of diallyl isophthalate.

Production Example 4

Into a 2 liter three-neck flask with a distillation unit, 1,477.6 g (6.0 mol) of diallyl isophthalate, 589.9 g (1.0 mol) of 4,4'-bis(2-hydroxyethoxy)-3,3',5,5'-tetrabromodiphenyl and 0.7388 g (0.05% by mass based on diallyl isophthalate) of dibutyltin oxide were charged. The system was heated at 180° C. in a nitrogen stream to distill off the allyl alcohol generated. When about 81 g of allyl alcohol was distilled off, the pressure inside the reaction system was reduced to 1.33 kPa to accelerate the distillation of allyl alcohol. After a theoretical amount (116.2 g) of allyl alcohol was distilled off, the system was heated for another one hour and then kept at 190° C. and 0.13 kPa for one hour. Thereafter, the reactor was cooled and, as a result, 1,951 g of an allyl ester compound was obtained (hereinafter referred to as "Sample D").

Sample D was analyzed by gas chromatography (GC-14B manufactured by Shimadzu Kagaku Co., Ltd., hydrogen flame ionization detector, column used: OV-17 of 0.5 m, the temperature condition: 160° C. and constant) and found to contain 55% by mass of diallyl isophthalate.

Production Example 5

Into a 1 liter three-neck flask with a distillation unit, 1709.3 g (6.94 mol) of diallyl isophthalate, 632.0 g (1.0 mol) of 2,2-bis[4-(2-hydroxyethoxy)-3,5-dibromophenyl] propane and 1.4776 g (0.08644% by mass based on diallyl isophthalate) of dibutyltin oxide were charged. The system was heated at 160° C. in a nitrogen stream to distill off the allyl alcohol generated. When about 81 g of allyl alcohol was distilled off, the pressure inside the reaction system was reduced to 1.33 kPa to accelerate the distillation of allyl alcohol. After a theoretical amount (116.2 g) of allyl alcohol was distilled off, the system was heated for another one hour and then kept at 160° C. and 0.13 kPa for one hour. Thereafter, the reactor was cooled and, as a result, 2,225 g of an allyl ester compound was obtained (hereinafter referred to as "Sample E").

Sample E was analyzed by gas chromatography (GC-14B manufactured by Shimadzu Kagaku Co., Ltd., hydrogen flame ionization detector, column used: OV-17 of 0.5 m, the temperature condition: 160° C. and constant) and found to contain 58% by mass of diallyl isophthalate.

Production Example 6

Into a 1 liter three-neck flask with a distillation unit, 492.5 g (2.0 mol) of diallyl terephthalate, 632.0 g (1.0 mol) of 2,2-bis[4-(2-hydroxyethoxy)-3,5-dibromophenyl]propane and 0.7388 g (0.15% by mass based on diallyl terephthalate) of dibutyltin oxide were charged. The system was heated at 180° C. in a nitrogen stream to distill off the allyl alcohol generated. When about 81 g of allyl alcohol was distilled off, the pressure inside the reaction system was reduced to 1.33 kPa to accelerate the distillation of allyl alcohol. After a theoretical amount (116.2 g) of allyl alcohol was distilled off, the system was heated for another one hour and then kept at 190° C. and 0.13 kPa for one hour. Thereafter, the reactor was cooled and, as a result, 1,008 g of an allyl ester compound was obtained (hereinafter referred to as "Sample F").

Sample F was analyzed by gas chromatography (GC-14B manufactured by Shimadzu Kagaku Co., Ltd., hydrogen flame ionization detector, column used: OV-17 of 0.5 m, the temperature condition: 160° C. and constant) and found to contain 16% by mass of diallyl terephthalate.

Production Example 7

In the same manner as in Production Example 5 except for using 492.5 g of diallyl isophthalate in place of 492.5 g of diallyl terephthalate, 1,008 g of an allyl ester compound was obtained (hereinafter referred to as "Sample G").

Sample G was analyzed by gas chromatography (GC-14B manufactured by Shimadzu Kagaku Co., Ltd., hydrogen flame ionization detector, column used: OV-17 of 0.5 m, the temperature condition: 160° C. and constant) and found to contain 13% by mass of diallyl isophthalate.

EXAMPLE 1

As shown in Table 1, 80.0 parts by mass of the allyl ester compound as Sample A, 16.0 parts by mass of diallyl isophthalate, 4 parts by mass of CR-39 (produced by PPG) and 3 parts by mass of diisopropylperoxy dicarbonate (IPP) were blended and mixed with stirring to form a completely homogeneous solution composition. The viscosity at this time was measured. Thereafter, a vessel containing this solution was placed in a desiccator capable of depressurization and the pressure was reduced by a vacuum pump for about 15 minutes to deaerate the solution. The resulting solution composition was injected by a syringe into a mold fabricated from a glass-made mold for ophthalmic plastic lenses and a resin-made gasket, while taking care to prevent intermixing of gas, and then cured in an oven according to a temperature rising program such that heating at 40° C. for 7 hours, heating at from 40 to 60° C. for 10 hours, heating at from 60 to 80° C. for 3 hours, heating at 80° C. for 1 hour and heating at 85° C. for 2 hours was done.

The lens obtained was measured for refractive index, Abbe number, Barcol hardness and specific gravity at 23° C. The results are shown in Table 1.

EXAMPLES 2 TO 6

COMPARATIVE EXAMPLES 1 AND 2

Compositions were prepared according to the blending shown in Table 1 and, in the same manner as in Example 1, measured on the viscosity and then cured. The lenses obtained were measured for the refractive index, Abbe number, Barcol hardness and specific gravity at 23° C. The results are shown in Table 1.

Comparative Examples 1 and 2 correspond to Examples 1 and 2 of JP-A-7-33831, respectively.

TABLE 1

| | | Example 1 | Example 2 | Example 3 | Example 4 | Example 5 | Example 6 | Comparative Example 1 | Comparative Example 2 |
|---|---|---|---|---|---|---|---|---|---|
| Blending (parts by mass) | | | | | | | | | |
| Sample A | oligomer*) | 36.0 | | | | 33.3 | | | |
| | diallyl isophthalate | 44.0 | | | | 40.7 | | | |
| Sample B | oligomer*) | | 36.0 | | | | | | |
| | diallyl terephthalate | | 44.0 | | | | | | |
| Sample C | oligomer*) | | | 37.8 | | | | | |
| | diallyl isophthalate | | | 12.6 | | | | | |
| Sample D | oligomer*) | | | | 36.0 | | | | |
| | diallyl isophthalate | | | | 44.0 | | | | |
| Sample E | oligomer*) | | | | | | 40.3 | | |
| | diallyl isophthalate | | | | | | 55.7 | | |
| Sample F | oligomer*) | | | | | | | 44.0 | |
| | diallyl terephthalate | | | | | | | 6.0 | |
| Sample G | oligomer*) | | | | | | | | 43.5 |
| | diallyl isophthalate | | | | | | | | 6.5 |
| | diallyl terephthalate | | | 5.0 | | | | | 20.0 |
| diallyl isophthalate | | 16.0 | 16.0 | 35.6 | 16.0 | 6.0 | | 30.0 | 15.0 |
| diallyl phthalate | | | | | | | | 5.0 | |
| diallyl diphenate | | | | | | 10.0 | | | |
| CR-39 | | 4.0 | 4.0 | 4.0 | 4.0 | 4.0 | | | |
| allyl benzoate | | | | 5.0 | | | | 15.0 | |
| benzyl methacrylate | | | | | | | | | 15.0 |
| allyl 4-phenylbenzoate | | | | | | 6.0 | | | |
| benzyl maleate | | | | | | | 4.0 | | |
| Viscosity (25° C.) (mPa · s) | | 215 | 210 | 200 | 200 | 230 | 350 | 630 | 660 |
| Initiator IPP (parts by mass) | | 3 | 3 | 3 | 3 | 3 | | 3 | 3 |
| Physical properties of cured material | | | | | | | | | |
| Refractive index, $n_D$ | | 1.586 | 1.586 | 1.587 | 1.590 | 1.591 | 1.590 | 1.591 | 1.592 |
| Abbe number | | 34.0 | 32.7 | 32.0 | 34.0 | 31.0 | 32.5 | 32.0 | 34.0 |
| Barcol hardness | | 50 | 53 | 49 | 53 | 53 | 50 | 50 | 50 |
| Specific gravity | | 1.373 | 1.376 | 1.371 | 1.382 | 1.365 | 1.370 | 1.407 | 1.410 |

*Oligomer means a compound having at least one group represented by formula (1) as a terminal group and a group represented by formula (2) as a repeating unit.

EXAMPLE 7

As shown in Table 2, 80.0 parts by mass of the allyl ester compound as Sample A, 16.0 parts by mass of diallyl isophthalate, 4 parts by mass of CR-39 (produced by PPG), 0.08 parts by mass of ultraviolet absorbent of structural formula (38), 0.08 parts by mass of ultraviolet absorbent of structural formula (48) and 3 parts by mass of diisopropylperoxy dicarbonate (IPP) were blended and mixed with stirring to form a completely homogeneous solution composition. The viscosity at this time was measured. Thereafter, a vessel containing this solution was placed in a desiccator capable of depressurization and the pressure was reduced by a vacuum pump for about 15 minutes to deaerate the solution. The resulting solution composition was injected by a syringe into a mold fabricated from a glass-made mold for ophthalmic plastic lenses and a resin-made gasket, while taking care to prevent intermixing of gas, and then cured in an oven according to a temperature rising program such that heating at 40° C. for 7 hours, heating at from 40 to 60° C. for 10 hours, heating at from 60 to 80° C. for 3 hours, heating at 80° C. for 1 hour and heating at 85° C. for 2 hours was done.

The lens obtained was measured for refractive index, Abbe number, Barcol hardness, specific gravity at 23° C.

and with respect to the uniform sensory color space of Hunter (Hunter Lab-space), L value, a value and b value. The results are shown in Table 2.

EXAMPLES 8 TO 10

Compositions were prepared according to the blending shown in Table 2 and, in the same manner as in Example 1, measured for viscosity and then cured. The lenses obtained were measured for refractive index, Abbe number, Barcol hardness and specific gravity at 23° C. The results are shown in Table 2.

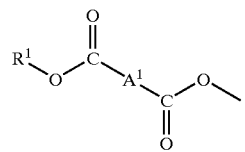

(1)

wherein each $R^1$ independently represents an allyl group or a methallyl group and each $A^1$ independently represents an

TABLE 2

| | | | Example 1 | Example 7 | Example 8 | Example 9 | Example 10 |
|---|---|---|---|---|---|---|---|
| Blending (parts by mass) | Sample A | oligomer*) | 36.0 | 36.0 | 36.0 | 36.0 | 36.0 |
| | | diallyl isophthalate | 44.0 | 44.0 | 44.0 | 44.0 | 44.0 |
| | diallyl isophthalate | | 16.0 | 16.0 | 16.0 | 16.0 | 16.0 |
| | CR-39 | | 4.0 | 4.0 | 4.0 | 4.0 | 4.0 |
| | compound of formula (38) | | | | 0.08 | 0.08 | |
| | compound of formula (41) | | | | | 0.1 | |
| | compound of formula (47) | | | | | | 0.1 |
| | compound of formula (48) | | | | 0.08 | | 0.08 |
| | compound of formula (50) | | | | | 0.2 | |
| | compound of formula (52) | | | | | 0.2 | |
| | compound of formula (80) | | | | 0.3 | 0.2 | 0.5 |
| Viscosity (25° C.) (mPa · s) | | | 215 | 218 | 214 | 216 | 217 |
| Initiator IPP (parts by mass) | | | 3 | 3 | 3 | 3 | 3 |
| Physical properties of cured material | Refractive index $n_D$ | | 1.586 | 1.586 | 1.586 | 1.586 | 1.586 |
| | Abbe number | | 34.0 | 34.0 | 34.0 | 34.0 | 34.0 |
| | Barcol hardness | | 50 | 50 | 50 | 50 | 50 |
| | Specific gravity | | 1.373 | 1.373 | 1.373 | 1.373 | 1.373 |
| Uniform sensory color space of Hunter immediately after curing | | Lab | 92.30 | 92.81 | 92.81 | 92.81 | 92.81 |
| | | | −0.48 | −0.48 | −0.48 | −0.48 | −0.48 |
| | | | 5.22 | 5.75 | 5.73 | 5.78 | 6.30 |

*Oligomer means a compound having at least one group represented by formula (1) as a terminal group and a group represented by formula (2) as a repeating unit.

As is apparent from the results in Tables 1 and 2, according to the present invention, a low-viscosity composition containing an allyl ester compound can be provided and, by curing this composition, a plastic lens having a high refractive index and a small specific gravity can be produced.

Industrial Applicability

The plastic lens composition of the present invention is low in viscosity as compared with conventional (meth)allyl-based plastic lens compositions and from the composition, a cured material having a high refractive index and a low specific gravity can be manufactured.

Accordingly, by the same curing method as used for conventional polyethylene glycol bis(allyl carbonate) resin, a plastic lens favored with high refraction and a low specific gravity can be produced.

What is claimed is:

1. A plastic lens composition comprising a component (α) shown below as an essential component, wherein a cured material, obtained by curing said composition, has a refractive index of 1.58 or more at 25° C. and a specific gravity of 1.40 or less at 23° C.:

Component (α):
 a compound having at least one group represented by the following formula (1) as a terminal group and a group represented by the following formula (2) as a repeating unit:

organic residue derived from a dicarboxylic acid or a carboxylic anhydride;

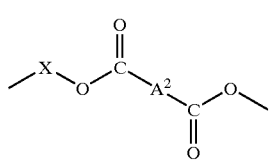

(2)

wherein each $A^2$ independently represents an organic residue derived from a dicarboxylic acid or a carboxylic anhydride and each X is independently an organic residue and the X's represent one or more organic residues containing, as an essential component, an organic residue derived from a bromine-containing compound having two or more hydroxyl groups, provided that, by the ester bonding, X can have a branched structure having a group of formula (1) as a terminal group and a group of formula (2) as a repeating unit.

2. A plastic lens composition comprising a component (α) and a component (β) shown below, wherein a cured material, obtained by curing said composition, has a refractive index of 1.58 or more at 25° C. and a specific gravity of 1.40 or less at 23° C.:

Component (α):
 a compound having at least one group represented by the following formula (1) as a terminal group and a group represented by the following formula (2) as a repeating unit, in an amount of 10 to 60% by mass based on whole curable components:

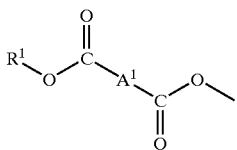
(1)

wherein each $R^1$ independently represents an allyl group or a methallyl group and each $A^1$ independently represents an organic residue derived from a dicarboxylic acid or a carboxylic anhydride;

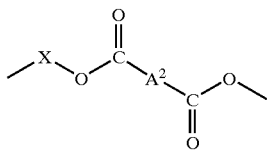
(2)

wherein each $A^2$ independently represents an organic residue derived from a dicarboxylic acid or a carboxylic anhydride and each X is independently an organic residue and the X's represent one or more organic residues containing, as an essential component, an organic residue derived from a bromine-containing compound having two or more hydroxyl groups, provided that, by the ester bonding, X can have a branched structure having a group of formula (1) as a terminal group and a group of formula (2) as a repeating unit;

Component (β):
    at least one compound selected from the group consisting of compounds represented by the following formulae (3) and (4), in an amount of 10 to 90% by mass based on whole curable components:

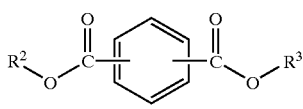
(3)

wherein $R^2$ and $R^3$ each independently represents an allyl group or a methallyl group;

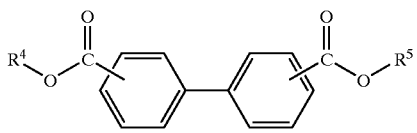
(4)

wherein $R^4$ and $R^5$ each independently represents an allyl group or a methallyl group.

3. A plastic lens composition comprising a component (α), a component (β) and a component (γ) shown below, wherein a cured material, obtained by curing said composition, has a refractive index of 1.58 or more at 25° C. and a specific gravity of 1.40 or less at 23° C.:

Component (α):
    a compound having at least one group[(9)] represented by the following formula (1) as a terminal group and a group represented by the following formula (2) as a repeating unit, in an amount of 10 to 60% by mass based on whole curable components:

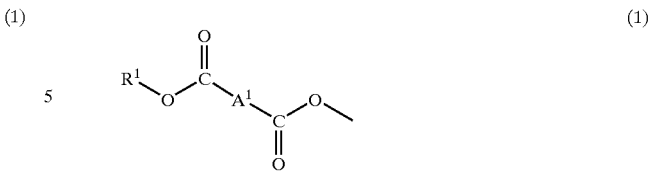
(1)

wherein each $R^1$ independently represents an allyl group or a methallyl group and each $A^1$ independently represents an organic residue derived from a dicarboxylic acid or a carboxylic anhydride;

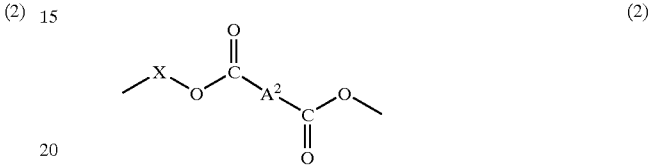
(2)

wherein each $A^2$ independently represents an organic residue derived from a dicarboxylic acid or a carboxylic anhydride and each X is independently an organic residue and the X's represent one or more organic residues containing, as an essential component, an organic residue derived from a bromine-containing compound having two or more hydroxyl groups, provided that, by the ester bonding, X can have a branched structure having a group of formula (1) as a terminal group and a group of formula (2) as a repeating unit;

Component (β):
    at least one compound selected from the group consisting of compounds represented by the following formulae (3) and (4), in an amount of 10 to 90% by mass based on whole curable components:

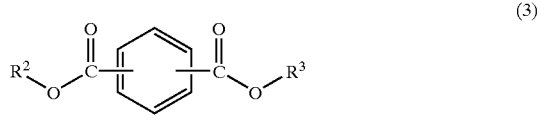
(3)

wherein $R^2$ and $R^3$ each independently represents an allyl group or a methallyl group;

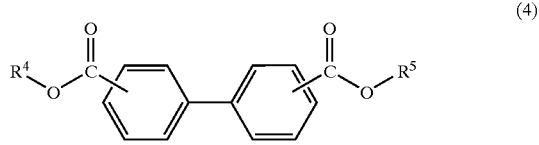
(4)

wherein $R^4$ and $R^5$ each independently represents an allyl group or a methallyl group;

Component (γ):
    at least one compound selected from the group consisting of dibenzyl maleate, diphenyl maleate, dibenzyl fumarate, diphenyl fumarate, (meth)allyl 2-phenylbenzoate, (meth)allyl 3-phenylbenzoate, (meth)allyl 4-phenylbenzoate, (meth)allyl α-naphthoate, (meth)allyl β-naphthoate, (meth)allyl o-chlorobenzoate, (meth)allyl m-chlorobenzoate, (meth)allyl p-chlorobenzoate, (meth)allyl 2,6-dichlorobenzoate, (meth)allyl 2,4-dichlorobenzoate, (meth)allyl o-bromobenzoate, (meth)allyl m-bromobenzoate and (meth)allyl p-bromobenzoate, in an amount of 0 to 20% by mass based on whole curable components.

4. A plastic lens composition, as claimed in any one of claims 1 to 3, wherein the bromine-containing compound is at least one compound selected from the compounds represented by the following formulae (9) and (10):

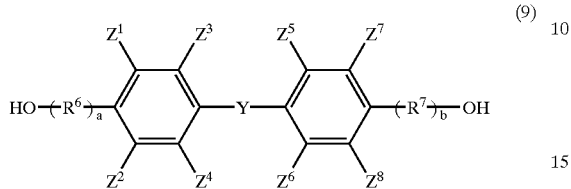

(9)

wherein each $R^6$ independently represents an organic group represented by structural formula (11), (12) or (13) shown below, each $R^7$ independently represents a group selected from the groups of structural formulae (14) to (16) shown below, a and b each independently represents 0 or an integer of 1 to 10, $Z^1$, $Z^2$, $Z^3$, $Z^4$, $Z^5$, $Z^6$, $Z^7$ and $Z^8$ each independently represents a substituent selected from the group consisting of bromine, chlorine and hydrogen, provided that at least one of $Z^1$, $Z^2$, $Z^3$, $Z^4$, $Z^5$, $Z^6$, $Z^7$ and $Z^8$ is bromine, and Y represents an organic group represented by structural formula (17) or (18) shown below:

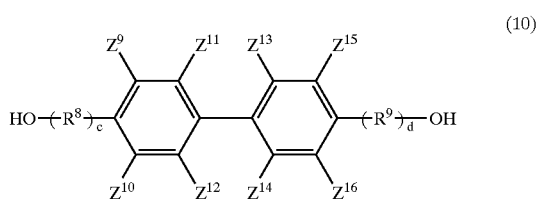

(10)

wherein each $R^8$ independently represents an organic group represented by structural formula (19), (20) or (21) shown below, each $R^9$ represents a group selected from the groups of structural formulae (22) to (24) shown below, c and d each independently represents 0 or an integer of 1 to 10, and $Z^9$, $Z^{10}$, $Z^{11}$, $Z^{12}$, $Z^{13}$, $Z^{14}$, $Z^{15}$ and $Z^{16}$ each independently represents a substituent selected from the group consisting of bromine, chlorine and hydrogen, provided that at least one of $Z^9$, $Z^{10}$, $Z^{11}$, $Z^{12}$, $Z^{13}$, $Z^{14}$, $Z^{15}$ and $Z^{16}$ is bromine:

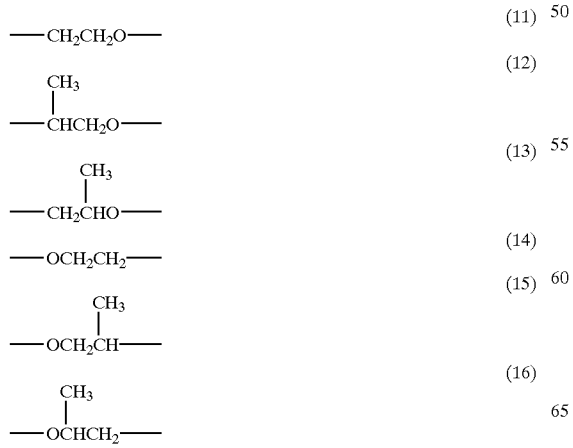

(11)

(12)

(13)

(14)

(15)

(16)

—CH$_2$—   (17)

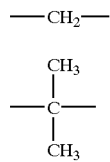   (18)

—CH$_2$CH$_2$O—   (19)

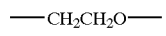   (20)

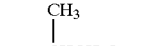   (21)

—OCH$_2$CH$_2$—   (22)

   (23)

   (24)

5. A plastic lens composition, as claimed in any one of claims 1 to 3, which has a viscosity at 25° C. of less than 400 mPa·s.

6. A plastic lens composition, as claimed in any one of claims 1 to 3, which further comprises at least one ultraviolet absorbent and/or at least one light stabilizer in an amount of 0.01 to 2 parts by mass per 100 parts by mass of whole curable components in the plastic lens composition.

7. A plastic lens composition, as claimed in claim 6, wherein at least one of the ultraviolet absorbent is a compound having a moiety represented by the following structural formula (26) within the molecule:

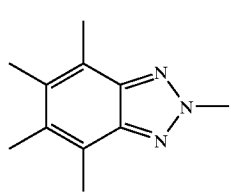

(26)

8. A plastic lens composition, as claimed in any one of claims 1 to 3, which further comprises at least one antioxidant in an amount of 0.01 to 5 parts by mass per 100 parts by mass of whole curable components in the plastic lens composition.

9. A plastic lens composition, as claimed in claim 8, wherein at least one of the antioxidants is a phosphite-based antioxidant.

10. A plastic lens composition, as claimed in any one of claims 1 to 3, which further comprises at least one radical polymerization initiator in an amount of 0.1 to 10 parts by mass per 100 parts by mass of whole curable components in the plastic lens composition.

11. A plastic lens composition, as claimed in claim 10, wherein at least one of the radical polymerization initiators is a compound having a structure represented by the following formula (94):

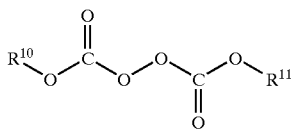

(94)

wherein $R^{10}$ and $R^{11}$ each independently represents a group selected from the group consisting of an alkyl group having from 1 to 10 carbon atoms, a substituted alkyl group, a phenyl group and a substituted phenyl group.

12. A plastic lens having a refractive index of 1.58 or more at 25° C. and a specific gravity of 1.40 or less at 23° C. which is obtained by curing a plastic lens composition as set forth in any one of claims 1 to 3.

13. A plastic lens having a refrative index of 1.58 or more at 25° C., a specific gravity of 1.40 or less at 23° C., a carbon concentration by elemental analysis of 50.0 to 70.0% by mass and a bromine concentration by elemental analysis of 9.0 to 15.0% by mass.

14. A process for producing a plastic lens, comprising curing a plastic lens composition as set forth in any one of claims 1 to 3.

15. A process, as claimed in claim 14, wherein the plastic lens composition is cured by cast polymerization at a polymerization temperature of 30 to 120° C. for a polymerization time of 0.5 to 100 hours.

16. A plastic lens composition, as claimed in claim 4, which has a viscosity at 25° C. of less than 400 mPa·s.

17. A plastic lens composition, as claimed in claim 4, which further comprises at least one ultraviolet absorbent and/or at least one light stabilizer in an amount of 0.01 to 2 parts by mass per 100 parts by mass of whole curable components in the plastic lens composition.

18. A plastic lens composition, as claimed in claim 5, which further comprises at least one ultraviolet absorbent and/or at least one light stabilizer in an amount of 0.01 to 2 parts by mass per 100 parts by mass of whole curable components in the plastic lens composition.

19. A plastic lens composition, as claimed in claim 17, wherein at least one of the ultraviolet absorbents is a compound having a moiety represented by the following structural formula (26) within the molecule:

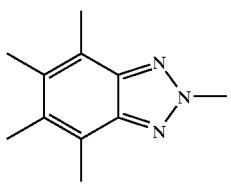

(26)

20. A plastic lens composition, as claimed in claim 13, wherein at least one of the ultraviolet absorbents is a compound having a moiety represented by the following structural formula (26) within the molecule:

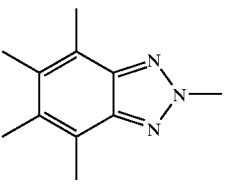

(26)

21. A plastic lens composition, as claimed in claim 4, which further comprises at least one antioxidant in an amount of 0.01 to 5 parts by mass per 100 parts by mass of whole curable components in the plastic lens composition.

22. A plastic lens composition, as claimed in claim 5, which further comprises at least one antioxidant in an amount of 0.01 to 5 parts by mass per 100 parts by mass of whole curable components in the plastic lens composition.

23. A plastic lens composition, as claimed in claim 6 which further comprises at least one antioxidant in an amount of 0.01 to 5 parts by mass per 100 parts by mass of whole curable components in the plastic lens composition.

24. A plastic lens composition, as claimed a claim 21, wherein at least one of the antioxidants is a phosphite-based antioxidant.

25. A plastic lens composition, as claimed in claim 22, wherein at least one the antioxidants is a phosphite-based antioxidant.

26. A plastic lens composition, as claimed in claim 23, wherein at least one of the antioxidants is a phosphite-based antioxidant.

27. A plastic lens composition, as claimed in claim 4, which further comprises at least one radical polymerization initiator in an amount of 0.1 to 10 parts by mass per 100 parts by mass of whole curable components in the plastic lens composition.

28. A plastic lens composition, as claimed in claim 5, which further comprises at least one radical polymerization initiator in an amount of 0.1 to 10 parts by mass per 100 parts by mass of whole curable components in the plastic lens composition.

29. A plastic lens composition, as claimed in claim 6, which further comprises at least one radical polymerization initiator in an amount of 0.1 to 10 parts by mass per 100 parts by mass of whole curable components in the plastic lens composition.

30. A plastic lens composition, as claimed in claim 8, which further comprises at least one radical polymerization initiator in an amount of 0.1 to 10 parts by mass per 100 parts by mass of whole curable components in the plastic lens composition.

31. A plastic lens composition, as claimed in claim 27, wherein at least one of the radical polymerization initiators is a compound having a structure represented by the following formula (94):

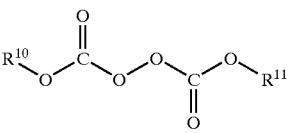

(94)

wherein $R^{10}$ and $R^{11}$ each independently represents a group selected from the group consisting of an alkyl group having from 1 to 10 carbon atoms, a substituted alkyl group, a phenyl group and a substituted phenyl group.

32. A plastic lens composition, as claimed in claim 28, wherein at least one of the radical polymerization initiators is a compound having a sturture represented by the following formula (94):

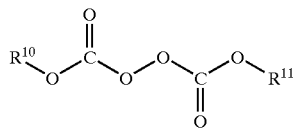
(94)

wherein $R^{10}$ and $R^{11}$ each independently represents a group selected from the group consisting of an alkyl group having from 1 to 10 carbon atoms, a substituted alkyl group, a phenyl group and a substituted phenyl group.

33. A plastic lens composition, as claimed in claim 29, wherein at least one of the radical polymerization initiators is a compound having a sturture represented by the following formula (94):

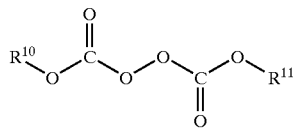
(94)

wherein $R^{10}$ and $R^{11}$ each independently represents a group selected from the group consisting of an alkyl group having from 1 to 10 carbon atoms, a substituted alkyl group, a phenyl group and a substituted phenyl group.

34. A plastic lens composition, as claimed in claim 30, wherein at least one of the radical polymerization initiators is a compound having a structure represented by the following formula (94):

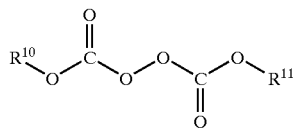
(94)

wherein $R^{10}$ and $R^{11}$ each independently represents a group selected from the group consisting of an alkyl group having from 1 to 10 carbon atoms, a substituted alkyl group, a phenyl group and a substituted phenyl group.

35. A plastic lens having a refractive index of 1.58 or more at 25° C. and a specific gravity of 1.40 or less at 23° C. which is obtained by curing a plastic lens composition as set forth in claim 4.

36. A plastic lens having a refractive index of 1.58 or more at 25° C. and a specific gravity of 1.40 or less at 23° C., which is obtained by curing a plastic lens composition as set forth in claim 5.

37. A plastic lens having a refractive index of 1.58 or more at 25° C. and a specific gravity of 1.40 or less at 23° C., which is obtained by curing a plastic lens composition as set forth in claim 6.

38. A plastic lens having a refractive index of 1.58 or more at 25° C. and a specific gravity of 1.40 or less at 23° C., which is obtained by curing a plastic lens composition as set forth in claim 8.

39. A plastic lens having a refractive index of 1.58 or more at 25° C. and a specific gravity of 1.40 or less at 23° C., which is obtained by curing a plastic lens composition as set forth in claim 10.

40. A plastic lens having a refractive index of 1.58 or more at 25° C. and a specific gravity of 1.40 or less at 23° C., which is obtained by curing a plastic lens composition as set forth in claim 27.

41. A plastic lens having a refractive index of 1.58 or more at 25° C. and a specific gravity of 1.40 or less at 23° C., which is obtained by curing a plastic lens composition as set forth in claim 28.

42. A plastic lens having a refractive index of 1.58 or more at 25° C. and a specific gravity of 1.40 or less at 23° C., which is obtained by curing a plastic lens composition as set forth in claim 29.

43. A plastic lens having a refractive index of 1.58 or more at 25° C. and a specific gravity of 1.40 or less at 23° C., which is obtained by curing a plastic lens composition as set forth in claim 30.

44. A process for producing a plastic lens, comprising curing a plastic lens composition as set forth in claim 4.

45. A process for producing a plastic lens, comprising curing a plastic lens composition as set forth in claim 5.

46. A process for producing a plastic lens, comprising curing a plastic lens composition as set forth in claim 6.

47. A process for producing a plastic lens, comprising curing a plastic lens composition as set forth in claim 8.

48. A process for producing a plastic lens, comprising curing a plastic lens composition as set forth in claim 10.

49. A process for producing a plastic lens, comprising curing a plastic lens composition as set forth in claim 27.

50. A process for producing a plastic lens, comprising curing a plastic lens composition as set forth in claim 28.

51. A process for producing a plastic lens, comprising curing a plastic lens composition as set forth in claim 29.

52. A process for producing a plastic lens, comprising curing a plastic lens composition as set forth in claim 30.

53. A process, as claimed in claim 49, wherein the plastic lens composition is cured by cast polymerization at a polymerization temperature of 30 to 120° C. for a polymerization time of 0.5 to 100 hours.

54. A process, as claimed in claim 50, wherein the plastic lens composition is cured by cast polymerization at a polymerization temperature of 30 to 120° C. for a polymerization time of 0.5 to 100 hours.

55. A process, as claimed in claim 51, wherein the plastic lens composition is cured by cast polymerization at a polymerization temperature of 30 to 120° C. for a polymerization time of 0.5 to 100 hours.

56. A process, as claimed in claim 52, wherein the plastic lens composition is cured by cast polymerization at a polymerization temperature of 30 to 120° C. for a polymerization time of 0.5 to 100 hours.

* * * * *